(12) United States Patent
Simms et al.

(10) Patent No.: US 11,461,380 B2
(45) Date of Patent: *Oct. 4, 2022

(54) SYSTEM AND METHOD FOR TAGGING A REGION WITHIN A DISTRIBUTED VIDEO FILE

(71) Applicant: Tagmotion Pty Limited, Paddington (AU)

(72) Inventors: Andrew Simms, Bondi Junction (AU); John Vernon Polglase, Bundella (AU)

(73) Assignee: Tagmotion Pty Limited, Paddington (AU)

( * ) Notice: Subject to any disclaimer, the term of this patent is extended or adjusted under 35 U.S.C. 154(b) by 98 days.

This patent is subject to a terminal disclaimer.

(21) Appl. No.: 17/061,469

(22) Filed: Oct. 1, 2020

(65) Prior Publication Data

US 2021/0073259 A1 Mar. 11, 2021

Related U.S. Application Data

(63) Continuation of application No. 14/325,216, filed on Jul. 7, 2014, now Pat. No. 10,795,924, which is a continuation of application No. 12/445,055, filed as application No. PCT/AU2007/001559 on Oct. 11, 2007.

(30) Foreign Application Priority Data

Oct. 11, 2006 (AU) .................................. 2006905774

(51) Int. Cl.
*G06F 16/41* (2019.01)
*G06F 16/435* (2019.01)
*G06F 16/438* (2019.01)
*G06F 16/48* (2019.01)
*G06Q 30/02* (2012.01)

(52) U.S. Cl.
CPC ............ *G06F 16/41* (2019.01); *G06F 16/435* (2019.01); *G06F 16/4387* (2019.01); *G06F 16/48* (2019.01); *G06Q 30/0251* (2013.01); *G06Q 30/0261* (2013.01); *G06Q 30/0263* (2013.01); *G06Q 30/0273* (2013.01)

(58) Field of Classification Search
CPC .... G06F 16/41; G06F 16/435; G06F 16/4387; G06F 16/48; G06Q 30/0251; G06Q 30/0261; G06Q 30/0263; G06Q 30/0273
See application file for complete search history.

(56) References Cited

U.S. PATENT DOCUMENTS

| | | |
|---|---|---|
| 6,182,069 B1 | 1/2001 | Niblack et al. |
| 6,484,156 B1 | 11/2002 | Gupta et al. |
| 7,430,360 B2 | 9/2008 | Abecassis |
| 7,870,592 B2 | 1/2011 | Hudson et al. |
| 7,885,963 B2 | 2/2011 | Sanders |
| 2002/0069218 A1 | 6/2002 | Sull et al. |
| 2003/0093790 A1 | 5/2003 | Logan et al. |
| 2003/0154009 A1 | 8/2003 | Basir et al. |

(Continued)

FOREIGN PATENT DOCUMENTS

| | | |
|---|---|---|
| WO | WO 02/079902 A2 | 10/2002 |
| WO | WO 02/080524 A2 | 10/2002 |
| WO | WO 2004/109539 A1 | 12/2004 |

*Primary Examiner* — Jorge A Casanova
(74) *Attorney, Agent, or Firm* — Southern Cross Intellectual Property

(57) ABSTRACT

A system and method for tagging a region within a frame of a distributed video file to permit easier retrievability of the region of interest.

16 Claims, 29 Drawing Sheets

(56) References Cited

U.S. PATENT DOCUMENTS

| | | |
|---|---|---|
| 2003/0194211 A1 | 10/2003 | Abecassis |
| 2004/0111465 A1 | 6/2004 | Chuang et al. |
| 2004/0125877 A1 | 7/2004 | Chuang et al. |
| 2004/0194141 A1 | 9/2004 | Sanders |
| 2005/0075886 A1 | 4/2005 | LeFebvre et al. |
| 2005/0144305 A1 | 6/2005 | Fegan, II |
| 2005/0165613 A1 | 7/2005 | Kim |
| 2006/0026144 A1 | 2/2006 | Chun et al. |
| 2006/0129909 A1 | 6/2006 | Butt et al. |
| 2006/0227997 A1 | 10/2006 | Au |
| 2007/0027628 A1 | 2/2007 | Geelen |
| 2007/0083556 A1 | 4/2007 | Plastina et al. |
| 2008/0007651 A1 | 1/2008 | Bennett |
| 2009/0012878 A1 | 1/2009 | Tedesco et al. |
| 2009/0234890 A1 | 9/2009 | Lee et al. |
| 2013/0103551 A1 | 4/2013 | Tedesco et al. |

Figure 9.

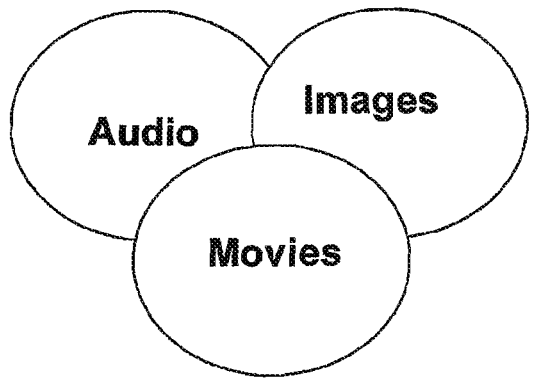

Figure 10.

| FILE FORMATS SUPPORTED | |
|---|---|
| - 3DMF | - MPEG-4 |
| - 3GPP | - MQV |
| - 3GPP2 | - M4A, M4B, M4P M4V |
| - AIFF | - PDF |
| - AMC | - Photoshop* |
| - AMR | - PICS |
| - Animated GIF | - PICT |
| - AU | - PLS |
| - Audio CD Data | - PNG |
| - AVI | - Quartz Composer Composition |
| - BMP | - QCP |
| - CAF | - QuickTime Image File |
| - Cubic VR | - QuickTime Movie |
| - DLS | - SD2 |
| - DV | - SDP |
| - FlashPix* | - SDV |
| - FLC | - SF2 |
| - GIF | - SGI |
| - GSM | - SMIL |
| - JPEG/JFIF | - System 7 Sound |
| - Karaoke | - Targa |
| - MacPaint | - Text |
| - MIDI | - TIFF* |
| - MPEG-1 | - TIFF Fax |
| - MP3 (MPEG-1, Layer 3) | - VDU |
| - M3U (MP3 Playlist files) | - Virtual Reality (VR) |
| - MPEG-2** | |

Figure 12.

| Metadata Levels | Metadata Type + Fields |
|---|---|
| 140 — Distributed digital repository | • URL / LOCATION |
| 142 — Whole of work | • KEYWORDS<br>• CLASSIFICATION TERMS / INFO. BRANCHES<br>• CATALOG ENTRIES (INCLUDING SHORT TITLE, FILENAME, LOCATION) |
| 144 — Segment | • SHORT TITLE<br>• START & STOP INFORMATION<br>• DURATION<br>• KEYWORDS<br>• CLASSIFICATION TERMS/ INFORMATION BRANCHES |
| 146 — Still frame | • POINT IN TIME, POINT IN SEGMENT<br>• SHORT TITLE |
| 148 — Region within the frame | • POINT IN TIME, POINT IN SEGMENT<br>• SHORT TITLE |

Figure 13

| Long Title | |
|---|---|
| Short Title | DET CLI Promo |
| Creator Organisation | |
| Creator First Name | |
| Creator Last Name | |
| Content Subject | |
| Content Summary | |
| Publisher Organisation | |
| Contributor Organisation | |
| Contributor First Name | |
| Contributor Last Name | |
| Creation Year | 2000 |
| Creation Month | January |
| Creation Day | 1 |
| Creation Location | |
| Creation Country | |
| Release Year | 2000 |
| Release Month | January |
| Release Day | 1 |
| Release Location | |
| Release Country | |
| Content Genre | |
| Content Language | English |
| Related Resource | |
| Spatial Coverage | |
| Temporal Coverage | |
| Creation Rights | |
| Classification | [Global Dictionary] CHANNELS |
| Original Media Type | Video |
| Source Locator | |
| Repository | http://cli.nsw.edu.au/cli/media/assets/ |
| File Name | cli_promo_hi.mov |
| File Format | MOV (QuickTime Movie) |
| File Size (kb) | 5924 |
| Start Time | 00:00:00.00 |
| Duration | 00:00:00.00 |

Figure 15.

A: Administrator
B: Librarian
C: Annotator
D: Searcher

| FUNCTIONS | ROLES | | | |
|---|---|---|---|---|
| | A | B | C | D |
| Supports the registration and management of users, database management | √ | x | x | x |
| Supports the registration of repositories | √ | √ | x | x |
| Supports the creation and importation/exportation of whole of work catalog entries | √ | √ | √ | x |
| Supports the creation and importation/exportation of personal dictionary terms (classification terms) | √ | √ | x | x |
| Supports the creation and importation/exportation of global dictionary terms (classification terms) | √ | √ | √ | x |
| Supports the selection of segments | √ | √ | √ | x |
| Supports the selection of frames (stills) | √ | √ | √ | x |
| Able to query the database and retrieve multimedia files for viewing | √ | √ | √ | √ |

SYSTEM AND METHOD FOR TAGGING A REGION WITHIN A DISTRIBUTED VIDEO FILE

FIELD OF THE INVENTION

The present invention relates to a method and apparatus for annotating and indexing electronic files with metadata, and navigating said metadata for retrieval and use by the user. More particularly the electronic files described in this embodiment of the invention are multimedia files, such as digital audio and video files, and the metadata applied to the files consists of both keywords and hierarchies of classification terms. Further, the present invention provides a method and apparatus for navigating large volumes of structured information including hierarchies of classification terms. The present invention also provides for a collaborative online environment where communities and groups can gather and exchange ideas through mash ups and the collaborative use of personal dictionaries.

BACKGROUND OF THE INVENTION

The desire for personal control, possession and ownership drove the evolution of computing from the handful of mainframe computers in large corporate, government and university settings decades ago to the situation today where personal computers now sit in homes and businesses everywhere.

But the widespread availability and ownership of personal computers in developed countries did nothing to quell consumers' thirst for personal 'computing' devices per se. Laptops, mobile phones, camera phones, games consoles, portable games consoles, portable music players and PDA's have proliferated in society alongside personal computers.

And in more recent times, as these kinds of devices have continued to proliferate, we have also seen major developments with software and services on the web. In particular, we have seen the evolution from peer-to-peer file sharing networks to social networks like LinkedIn and MySpace, to the explosion in video sharing websites like YouTube and MSN Video. These have all played their part in the rise of what's become known as social networking.

One of the major uses of the internet today is to disseminate, discuss, and otherwise consume multimedia content including videos, photos, and audio tracks. This is being done today, not only on personal computers, but also handheld mobile computing devices such as PDA's, digital mobile telephones, navigation devices, personal media players such as Apple's iPod, and indeed, devices which incorporate all of the features of these handheld devices such as the iPhone. Further, online multimedia content is being delivered directly to set top boxes and games consoles connected to the internet such as Tivo devices and Microsoft Xbox's.

One problem associated with accessing multimedia material on the internet is that more often than not, the segment of interest is often found within a larger multimedia file. For example, if a particular scene is found one hour into a movie, a link to that movie would generally take a user to the start of the movie and not to the section of interest.

Another problem associated with accessing multimedia material on the internet is that metadata associated with the multimedia file, which could be useful to determine relevancy, is often ambiguous and of little real help in determining what the multimedia file contains.

Another problem with prior art annotation and retrieval systems is that they provide little scope for using natural language and/or classification terms unique to the user. Ultimately there is little scope for personalisation of the process.

Further problems associated with prior art systems is that they are rigid with respect to users. Some systems provide for single user systems, whilst others are designed with groups in mind and are less amenable for use by a single user or different types of users.

Further problems associated with prior art systems is that they lack the ability to treat segments of multimedia files as entries in their own right in a metadata database without first physically creating segments for re-entry into the database. The creation of further copies of portions of multimedia files is therefore subject to copyright laws and the problems that are associated with them.

Further, some prior art systems lack the ability to associate database entries with logically segmented multimedia files.

Further problems with automated tools for extracting metadata from content (such as voice to text, voice recognition and pattern recognition tools) are that they are limited in that they cannot capture the range and depth of human interpretation. For example, does the footage of an allied soldier in the desert depict a soldier, a Sergeant, a son, an infidel, a hero, an American, a voter or a military uniform?

Further, multimedia annotation based on keywords is devoid of context. This ability to apply and preserve context will become more and more important as the volume of multimedia on the web increases. Context is important because keyword searches and searches involving combinations of keywords return massive numbers of hits, making it extremely difficult for users to identify the relevant file/s, and even more difficult to identify the relevant segment or point within a file. Further, context is important to online advertisers who need to target the particular type content in which they want their advertisements to appear in connection with.

OBJECTION OF THE INVENTION

It is an object of the invention to overcome at least some of the stated deficiencies of the prior art.

SUMMARY OF THE INVENTION

According to one aspect of the invention there is provided, a system for locating, segmenting, annotating and retrieving multimedia files, said system providing:
database of metadata relating to multimedia files;
database manager;
a database client for accessing the data contained within the database, said client providing:
deep linking functionality where the user can load, open and start the playing of a multimedia file from a point intermediate to its start and end point, and without the user having to experience the portion between the start point and the intermediate point;
segmentation functionality whereby large multimedia files can be broken down into shorter segments or individual frames (or still images) or regions within frames (or still images);
metadata annotation functionality wherein the user can annotate whole multimedia files, individual segments, frames and regions within frames with alphanumeric information;

retrieval functionality for browsing and searching the metadata; and access functionality for displaying and viewing the multimedia file;

wherein the user annotates the multimedia file or segment of multimedia file with metadata which is saved in the database, and wherein the user desired to locate a multimedia file, said metadata is searched or browsed to locate the database entry associated with multimedia file in question.

In a preferred embodiment of the invention, the annotation of the multimedia file or portion thereof is achieved by recording in the metadata saved in the database, a hierarchy of classification terms that form an information branch of the database's knowledge tree.

In a preferred embodiment of the invention the multimedia files are stored locally or are available to the database manager over an IP connection.

In a further preferred embodiment of the invention the IP connection is a HTTP connection over TCP/IP.

In a preferred embodiment of the invention the database manager provides for 2 or more types of user accounts.

In a further preferred embodiment of the invention the database manager provides for administrator, librarian, annotator and searcher user accounts.

In a further preferred embodiment of the invention there may be multiples of each user type.

In a further embodiment of the invention the user is able to annotate the multimedia file or segmented portion thereof within still video by selecting the lowermost classification term of the desired information branch.

In a further embodiment of the invention the user is able to select the lowermost classification term of the information branch by pointing, clicking and dragging the lowermost classification term to the relevant storyboard or catalog entry.

In a further embodiment of the invention the user is able to create overlapping segments of the one multimedia file by logically segmenting the original file in a way such that the end point of the first segment proceeds beyond the start point of the second segment.

In a preferred embodiment of the invention the database client is loaded onto a computing apparatus, said apparatus comprising at least one data processor, input and output modules, memory coupled to the at least one data processor and having stored therein programming instructions for performing data processing.

In a preferred embodiment of the invention, the computing apparatus further comprises persistent storage.

In a preferred embodiment of the invention, the computing apparatus further comprises a network adaptor which permits the integration of the computing apparatus on an IP network.

In a preferred embodiment of the invention, the IP network is the Internet, provided over a TCP/IP connection.

In a preferred embodiment of the invention the computing device is a personal computer or laptop.

In an another embodiment of the invention, the computing apparatus can be taken from the following list of devices: network workstations, set top boxes, digital mobile telephones, network IP routers, media players, games machines, NAS devices, video conferencing equipment and satellite navigation displays.

According to a further aspect of the invention there is provided a method for locating, segmenting and annotating multimedia files, said method comprising the following steps:

identifying the name and location of a multimedia file;
creating a database entry for associated metadata;
loading the multimedia file into memory;
assigning a short title to the database entry;
assigning keywords and information branches to the database entry;
segmenting the multimedia file with into shorter video and audio portions, still frames, and regions within still frames thereby-creating the at least a second database entry;
assigning a short title to the at least second database entry;
assigning keywords and information branches to the at least second database entry;
wherein each database entry's metadata is browsed and/or searched during the retrieval process by the user, said metadata ultimately providing the location and starting position of the multimedia file or portion thereof associated with the database entry.

The method further provides for retrieving the annotated multimedia files or portion of multimedia files by means of the user querying the database by browsing the database's knowledge tree to find information branches that are associated with the desired multimedia files or portions thereof, or by conducting keyword searches.

A preferred embodiment of this invention provides the additional step of providing the user with multiple views of the database's contents including at least a knowledge tree view.

In a further preferred embodiment of this method there is provided a further step of providing a manipulated view of the database's structure, the depiction comprising a contorted view of at least two information branches intersecting at nodes matching the search term, and wherein the user can jump up or drop down a level on the intersected tree to see the classification used in proximity to the intersected node in one view.

A further preferred embodiment of the invention involves the user selecting individual information branches from the intersected view for further analysis.

In a preferred embodiment of the invention, there is an active node of the knowledge tree which is associated with a further view depicting the contents of the knowledge tree at that point, as determined by the information branches contained within the database entries which correspond to certain parts of the database's knowledge tree.

In a preferred embodiment of the invention the user browses the knowledge tree by moving up, down and laterally to get to the next active node.

In a preferred embodiment of the invention the content view of each node on the knowledge tree is updated and kept live with each movement on the knowledge tree by the user.

In a preferred embodiment of the invention, the invention further comprises the step of highlighting on the knowledge tree those nodes of the tree that contained database entries which matched the search term used to query the database.

In a preferred embodiment of the invention the user can conduct a search using a keyword or alphanumeric string over the contents displayed as a result of selecting a certain node.

The method further provides that when the user locates a multimedia file through reference to metadata located in a database entry, the user is able to start playing the segmented portions of multimedia files, particularly audio and video multimedia files, from their start positions recorded in their database entries and not the true start position of the multimedia file.

According to a further aspect of the invention there is provided a system for a large group of users to locate, segment, annotate and retrieve multimedia files wherein access privileges can be modified for each user or type of user such that only certain multimedia files are available to that user or type of user, or that certain functions, such as adding new users are only granted to certain users or types of users.

According to a further aspect of the invention there is provided a method for providing targeted advertising for display to users whilst searches are being conducted, said method comprising the steps of:

identifying information branches and specific nodes on a knowledge tree;

auctioning or selling the right to display advertisements when the user browses over a node of the knowledge tree, selects a specific information branch, or when the user is viewing a multimedia file that has associated with its database entry at least one information branch corresponding to the one purchased by the advertiser;

displaying the advertisements of the highest bidder when the user browses over the auctioned node of the knowledge tree, or selects the auctioned off information branch, or when the user is viewing a multimedia file that has associated with its database entry at least one information branch that was purchased during the auction.

According to another aspect of the invention there is a method of providing targeted advertising, said method comprising the steps of:

identifying information branches and nodes on a knowledge tree;

creating a database entry for an advertiser which contains at least one information branch which describes the advertising content;

such that when a user is browsing the contents of a particular node or information branch the advertisement appears to the user as content.

According to another aspect of the invention there is provided a method for providing targeted advertising, said method comprising the following steps:

aggregating at least the metadata contained within disparate multimedia metadata databases in a central database accessible over the internet;

providing advertisers with the metadata used in each of the disparate multimedia metadata databases;

the advertisers bidding on the keyword, alphanumeric string, classification term or information branch that they desire, said bid including the details of which database users they wish to advertise to;

the database manager accepting the bidder or bidders that maximize the overall revenue raising capacity of the network;

the database manager communicating with the individual multimedia metadata databases that the advertiser has selected for advertising to its users, said communication including directions to associate the advertiser's advertisement with the keyword, alphanumeric string, classification term or information branch that the advertiser purchased such that users of the database will be presented the advertisement if the relevant keyword, alphanumeric string, classification term or information branch that the advertiser purchased is found in a search result or as a result of browsing.

In a preferred embodiment of this invention the disparate multimedia metadata databases provide the centralized database a detailed account of past searches conducted over the database and the results of those searches, these are provided to the advertisers in addition to the metadata so as to assist them in their decision making.

In a preferred embodiment of the invention the centralized database aggregates classification terms and information branches used in each database's knowledge tree which are then passed on to advertisers for their review and eventual bidding.

In a further embodiment of the invention there is provided a method for locating files that are available on the internet, wherein said method includes the following steps:

locating the file of interest on the internet;

adding a database entry to the metadata database in respect of the file;

annotating the database entry with metadata including at least information branches which describes the file;

incorporating the metadata into the database including the incorporation of information branches into a knowledge tree;

searching for the file by browsing or searching the metadata database knowledge tree;

obtaining the file from the internet once the relevant database entry is uncovered and the URL obtained.

BRIEF DESCRIPTION OF THE DRAWINGS

In order that the invention may be more readily understood and put into practical effect, reference will now be made to the accompanying drawings which each depict preferred embodiments of the present invention.

DETAILED DESCRIPTION OF THE INVENTION

The growth in the market for internet connected multimedia devices, including computers and laptops, combined with the rise of social networking has its roots in distinctly personal motivations. It is the desire to publish—whether to express oneself artistically or intellectually—the desire to 'be heard' or to initiate online 'conversations' and receive feedback, to share one's expertise and build a community of 'subscribers' to your content, or just to 'show off'.

What has become known as 'citizen journalism' is but one aspect of this phenomenon. The core motivation here is the same as for 'publishing' one's views via talkback radio, or in a journal, book or blog. But as more and more people turn to multimedia as their chosen form of expression and the internet as their chosen method of publishing, and with more and more people consuming this online content, the demand for simple, intuitive methods for navigating this content is increasing rapidly.

The key to having a flexible navigation system such as this is the existence of a personal metadata database as its foundation unit. This database contains the 'tags' that a person has created to allow him to easily navigate (search, browse and retrieve) content of interest. As more and more multimedia content is published, it becomes more and more important to be able to find exactly what one is interested in, from the ocean of choices available. This is the value of a contained, personal 'view'. By combining these personal databases to form group views and/or collective views, an individual can opt to use expanded, richer but also more complex views to navigate content, whenever he chooses. The creation, use and re-use of personal databases such as these is at the heart of this invention.

A personal metadata database, as described, can represent more value to its owner than its value purely as a superior navigation tool for multimedia.

Since the tags represent the meaning that humans ascribe to particular multimedia, they are of potential value to advertisers who want to reach people who use search terms the advertiser 'owns', as they browse, search and view the content that's been described using tags or combinations of tags in a personal metadata database.

Generally the present invention is concerned with providing systems and methods for one or more users to locate, annotate and/or retrieve multimedia files. Whilst the present invention will be described with respect to multimedia files and computers, the person skilled in the art will recognize the fact that the invention may be implemented in many different devices and situations.

Figure 1:
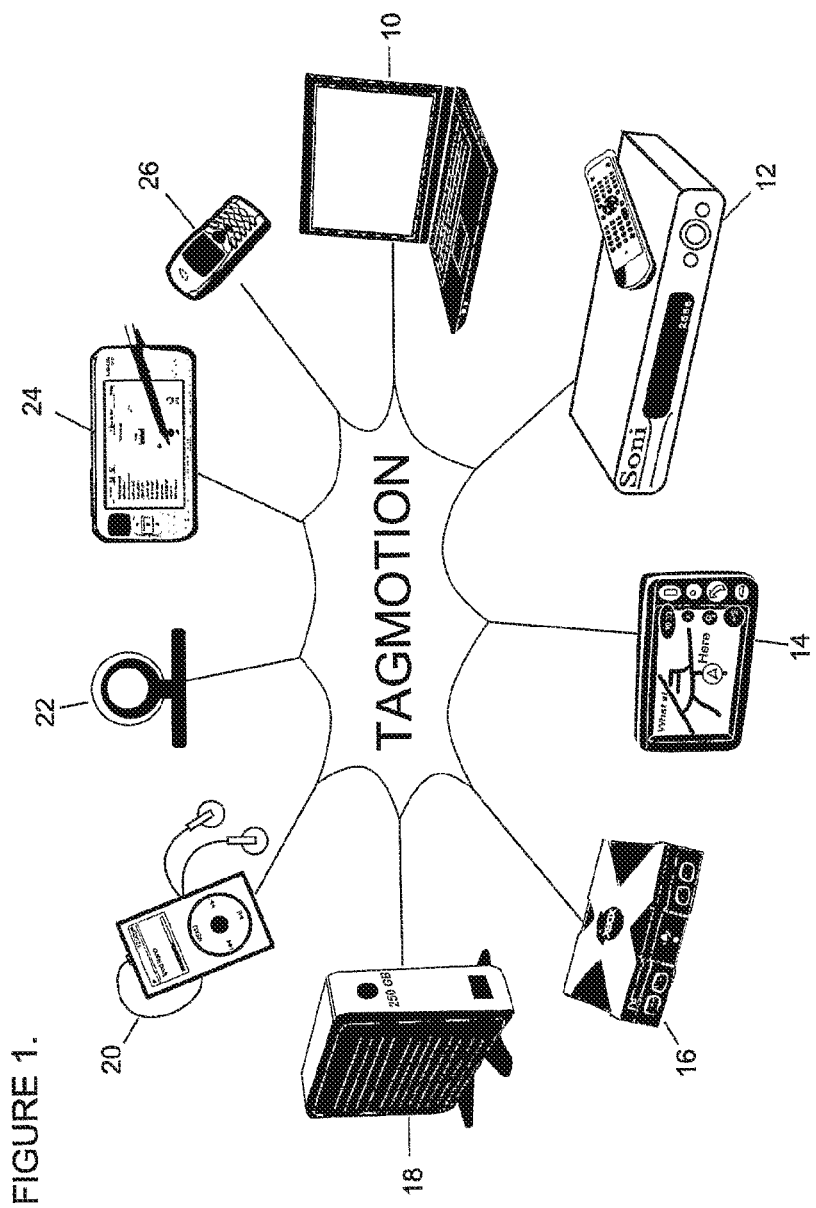
FIG. 1—depicts the devices the invention may be implemented upon

Turning to FIG. 1 the range of potential devices in which the invention may be implemented is depicted. Such devices include, laptop computer 10, set top box 12, internet connected navigational units 14, games consoles 16, network attached storage devices 18, and storage devices generally, portable music and/or games device 20, video conferencing device 22, personal digital assistant 24, and digital mobile telephone 26.

Figure 2:
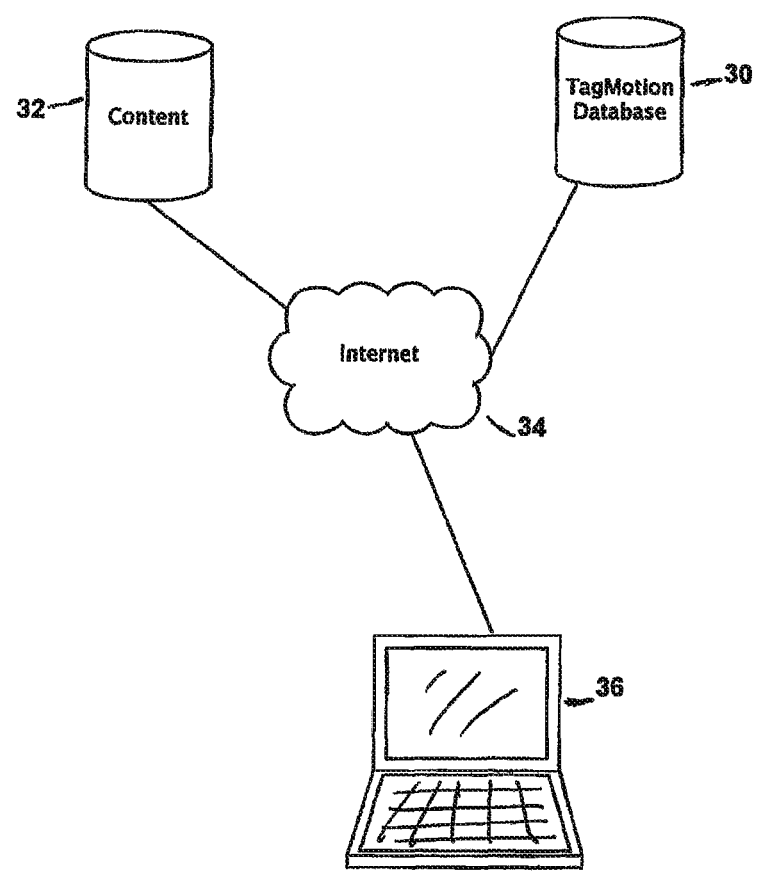
FIG. 2—depicts the basic constituents of one aspect of the invention

Turning to FIG. 2 the essence of the invention is disclosed which is database 30. This database contains only metadata about the multimedia files of interest. The multimedia files of interest are represented by online container 32, which is connected to database 30, through the internet 34. Ultimately the user sitting at computer 36 queries the database 30 via a client side application running on the computer (not shown). The database 30 instructs the computer 26 to obtain the multimedia file of interest from online container 32.

Figure 3:
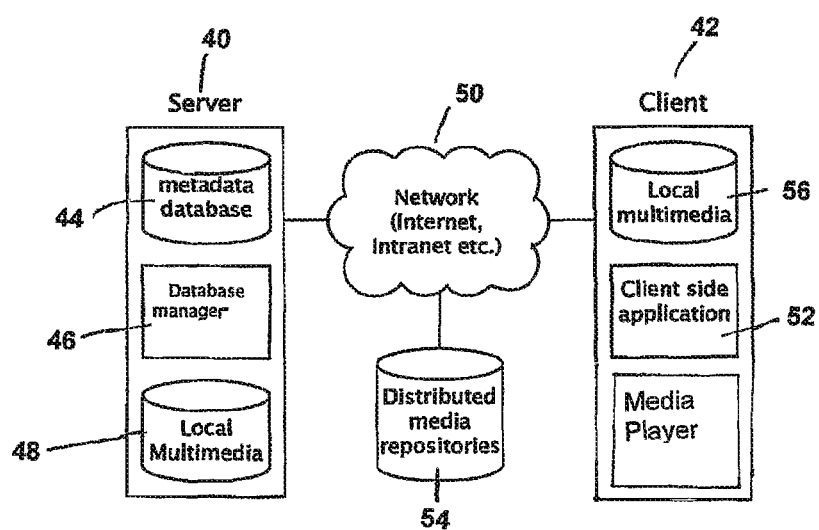
FIG. 3—depicts the logical architecture of one aspect of the invention

FIG. 3 depicts the arrangement of logical components which in the case of the present example depicted in FIG. 3 is implemented on two computers, a server 40, and a client 42, both containing multimedia content, in addition to an online storage repository 54 containing further multimedia content. On the server side 40, there are three main components, metadata database 44, database manager 46 and a local repository of multimedia files 48. The database manager 46 controls the access to and modifications to the database 44 which contains the information about the multimedia files located in local repository 48. However for these interactions to occur, a user needs access the database from the client computer 42 connected to server via a network connection 50 including those that run on the TCP/IP network protocol. Specifically, the user needs to operate the database client 52 to query database 44, through the actions of the database manager 46. The database 44 may contain metadata in respect of multimedia files located in repositories 54 and 56 if the contents of these repositories have been added to the database 44, via the database manager 46, and repository 48.

Figure 4:
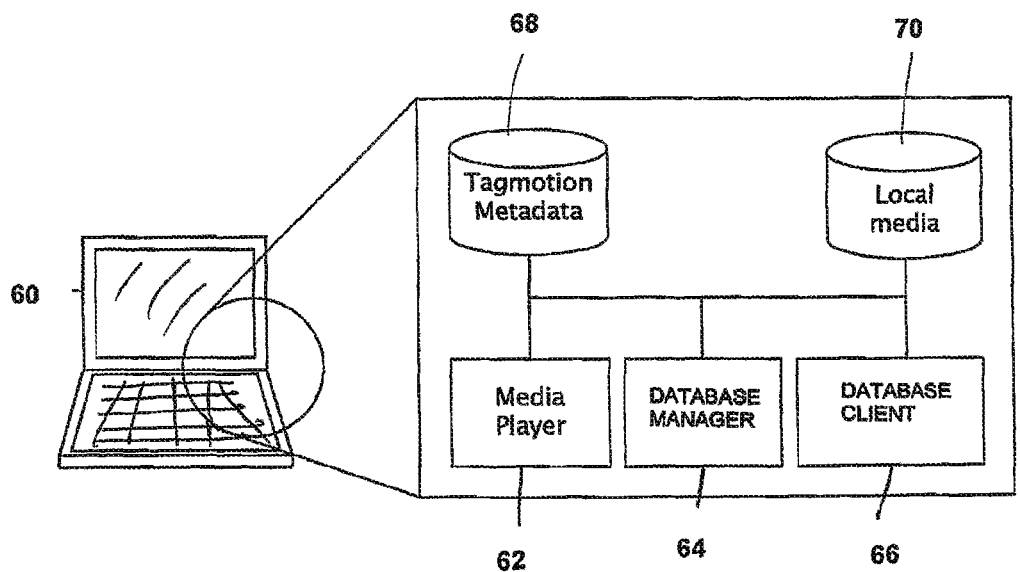
FIG. 4—depicts one aspect of the invention on one computer (locally)
Figure 5:
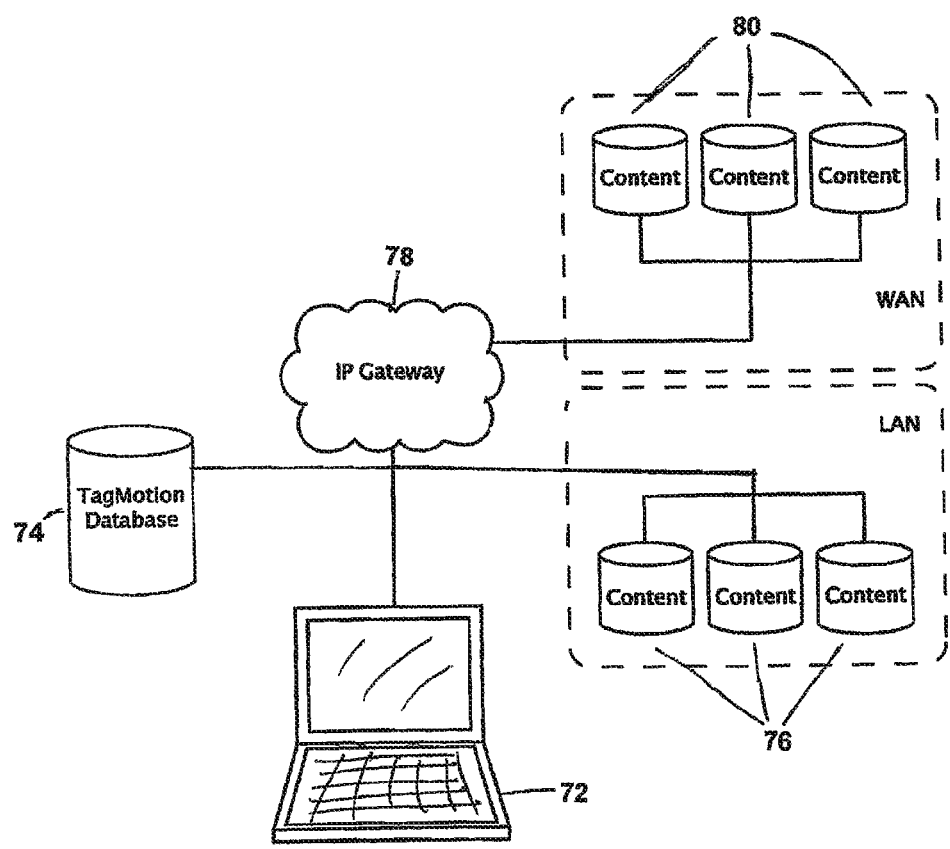
FIG. 5—depicts one aspect of the invention substantially on a LAN
Figure 6:
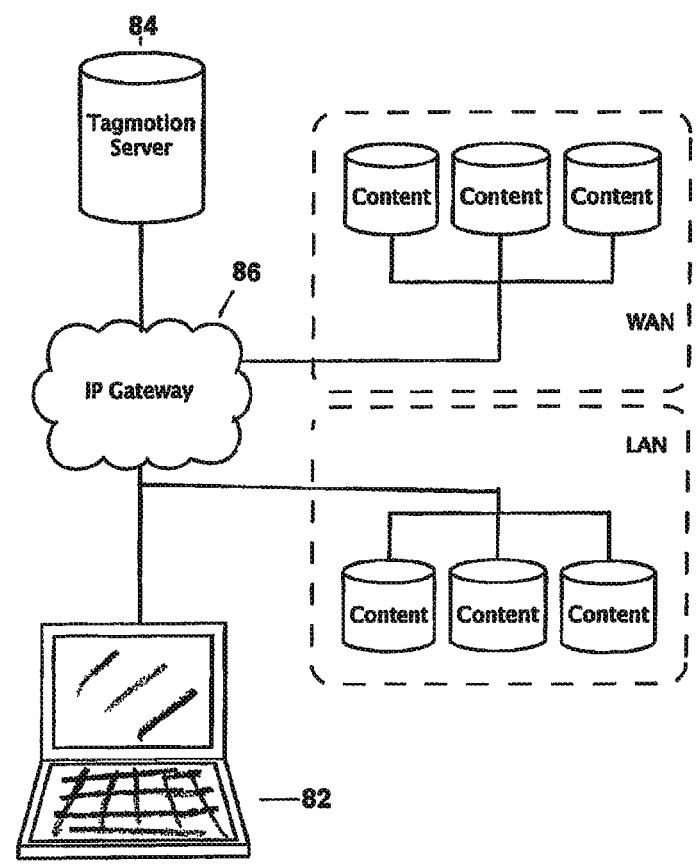
FIG. 6—depicts one aspect of the invention substantially on a WAN

FIGS. 4, 5, and 6 all depict alternative implementations of the invention. In particular the depiction in FIG. 4 is that of a computer 60, which has software that embodies the invention loaded onto it represented by the software objects 62, 64, and 66. The depiction in FIG. 4 is a that of a local implementation. All software modules and data reside on the one computer. The computer 60 does not communicate with any other computer on any network. Notwithstanding the fact that the implementation is local, the logical architecture remains the same as in the case of FIG. 3. In particular the computer 60 still needs to have loaded onto it client side applications being the media player 62 and database client 66. Further the implementation in FIG. 5 requires a database manager 64. In either of the implementations depicted in FIGS. 4, 5 and 6, the media files of interest located in the repositories are accessed by the media player through reference to the media files URL which may include both HTTP: and FILE: protocols.

FIG. 5 depicts an alternative arrangement, one which is predominantly LAN based. In this configuration the user operates computer 72 which contains the database client application, to query metadata database 74, which sits on the same local IP network as repository of multimedia files 76. The figure also depicts internet gateway 78 and a repository of multimedia files 80, located on the WAN. This configuration might be similar to what one would expect a small to medium media company to need to implement to manage their content stored on their corporate LAN with the occasional need to access materials on the greater WAN or internet.

FIG. 6 depicts a further arrangement of components including computer 82. However in the present example, the metadata database 84 is located on the other side of internet gateway 86 which places it on the internet or WAN.

Figure 7:
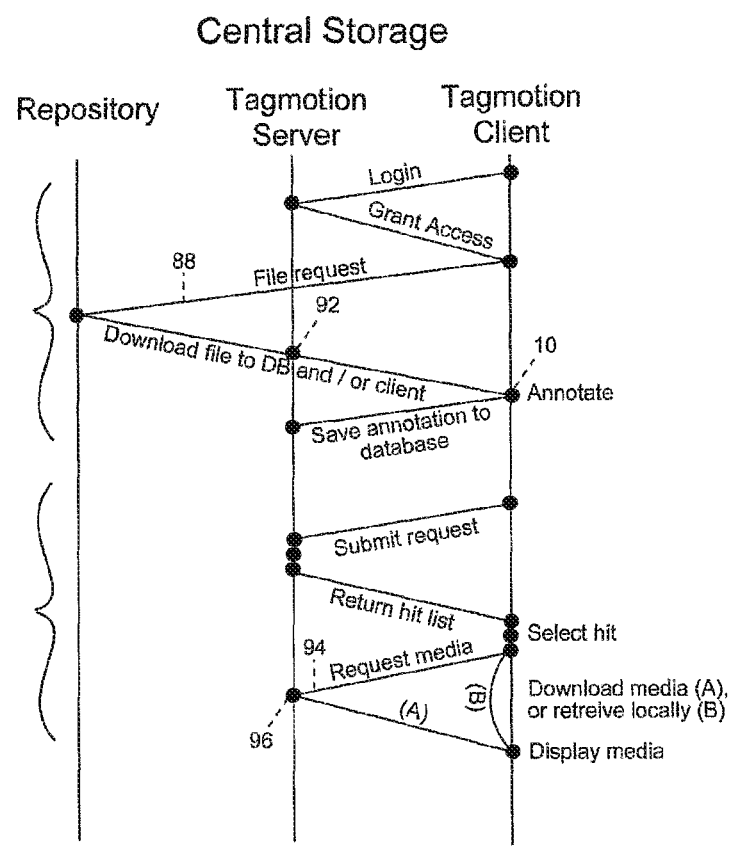
FIG. 7—depicts one aspect of the invention in which the content is hosted centrally FIG. 8—depicts a further aspect of the invention in which the content is hosted in a distributed manner FIG. 9—depicts the different multimedia files managed by one aspect of invention FIG. 10—depicts the file formats supported by one aspect of the invention FIG. 11—depicts a knowledge tree according to one aspect of the invention FIG. 12—depicts the segmentation and annotation functions of one aspect of the invention FIG. 13—depicts catalog entry fields FIG. 14—depicts overlapping segments of a multimedia file according to one aspect of the invention FIG. 15—depicts the hierarchy of user roles according to one aspect of the invention FIG. 16—depicts annotation and segmentation workflows in one aspect of the invention FIG. 17—depicts the retrieval process according to one aspect of the invention FIG. 18—depicts the retrieval process in more detail FIG. 19—depicts a knowledge tree of classification terms according to one aspect of the invention FIG. 20—depicts individual information branches of the knowledge tree FIG. 21—depicts classification terms as slices of a knowledge tree according to one aspect of the invention FIG. 22—depicts a screenshot after conducting a keyword search according to one aspect of the invention FIG. 23—depicts a screenshot after user rises the slider up on the intersected view according to one aspect of the invention FIG. 24—depicts devices accessing the metadata database according to one aspect of the invention FIG. 25—depicts a network of metadata databases according to one aspect of the invention FIG. 26—depicts a hub and advertiser server implementation according to one aspect of the invention FIG. 27—depicts various views of knowledge trees according to one aspect of the invention FIG. 28—depicts a screen shot post keyword search showing advertisements according to one aspect of the invention FIG. 29—depicts a screen shot after user selects one information branch according to one aspect of the invention FIG. 30—depicts a screen shot after user selects one of the videos in the search results according to one aspect of the invention.
Figure 8:
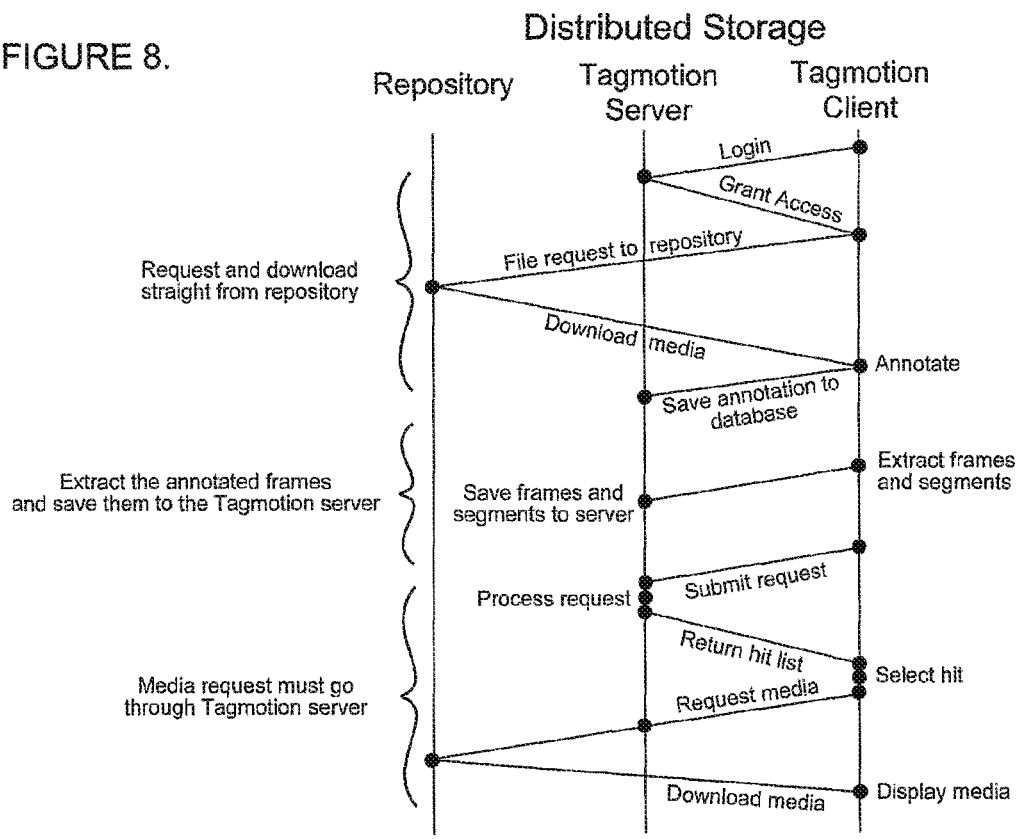

FIGS. 7 and 8 depicts two further alternative embodiments of the invention. The figure depicted in FIG. 8 is representative of the examples provided in FIGS. 6 and 7 in that the metadata database is kept separate from the repositories of multimedia files. As can be seen when regard is had to FIG. 8 the only data being saved to the metadata database is metadata. No copies of the multimedia files are maintained within the database for later retrieval. Further, once the database server instructs the client application resident on computer 82 where to find the multimedia file in question the client application goes and obtains it directly from the relevant online repository and not the server 84.

The depiction in 7 however is the opposite. In this scenario, when a multimedia file is requested during step 88 it is returned not only to the client application during step 90, but also the metadata database during step 92 such that when the file is requested during step 94, the file can be delivered centrally from the server during step 96 (or retrieved locally if it is still in its cache).

FIG. 9 depicts the types of multimedia files that one embodiment of the invention can manage. Presently the invention has been designed to operate with audio, still images, and video (either with or without sound). The person skilled in the art however will realize that the present invention has application outside of these three distinct areas and that these other areas fall within the scope of this invention. For example, the invention could equally be applied to collections of text or indeed, executables or other program files located on the internet. The file formats that are currently accepted by the present invention include those listed in FIG. 10.

Figure 11:
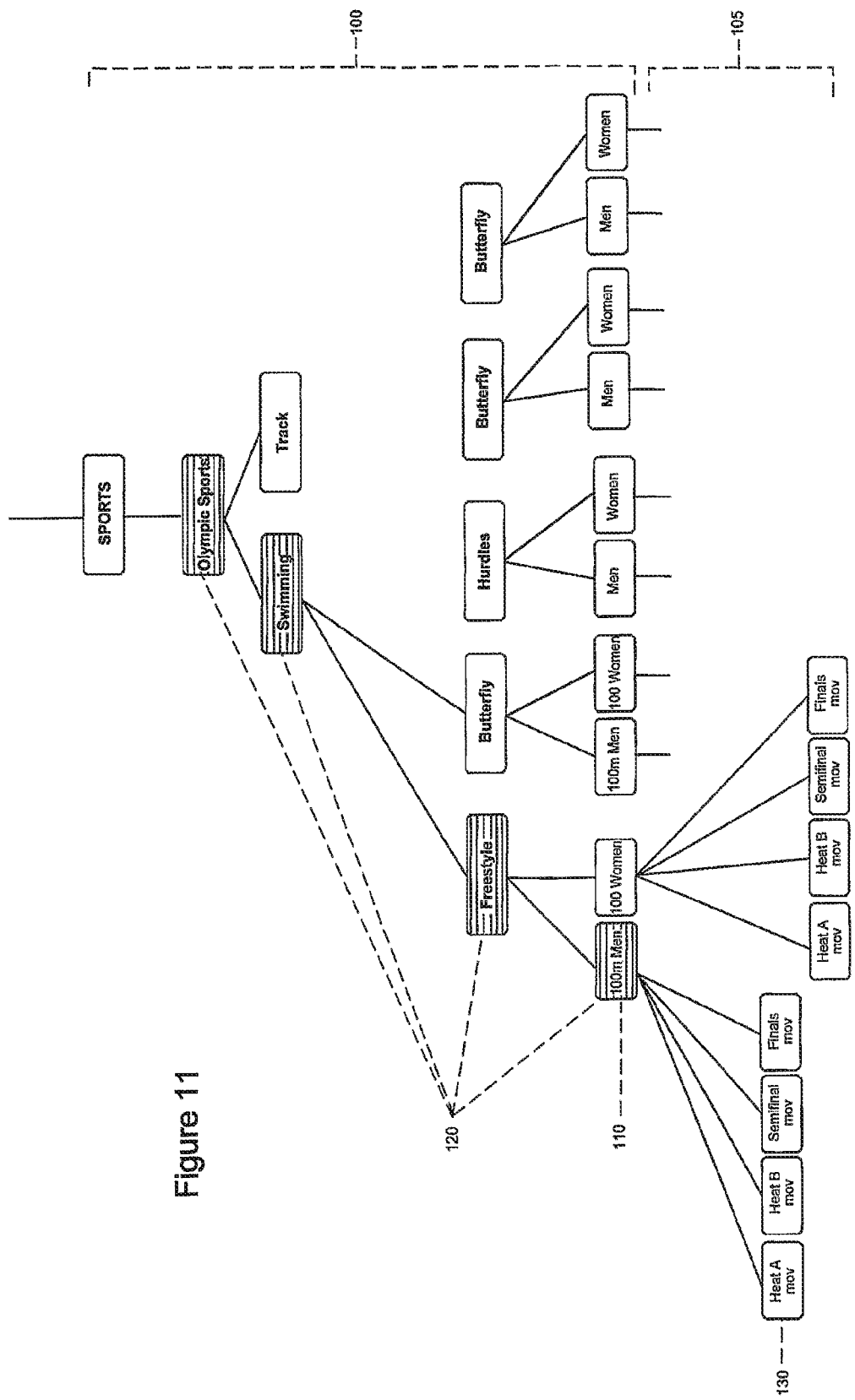

FIG. 11 depicts the way in which multimedia file metadata is arranged, being a hierarchical structure, according to one aspect of the invention. On the diagram, the knowledge tree 100 is depicted. It is comprised of nodes 110 which are classification terms taken from either the global or personal dictionary of the user. These terms are organized in a hierarchy such that the hierarchy of terms conveys more semantic meaning than any individual classification term or collection of terms where the relationship between the terms is not as apparent as it is in a hierarchy. It is this semantic meaning and attribution of the meaning to individual media files 105 and segments thereof. The individual media files do not form part of the knowledge tree 100. For example node 110 of the knowledge tree 100 contains a collection of multimedia files including HeatA.mov 130. Whilst not shown on the diagram, each node of any level can "contain" multimedia files, not just the lowermost one. In reality however, the node only contains a reference to the database entries that are associated with the multimedia file or segment thereof.

The user of the present invention is able to associate with the database entry one or more information branches 120. Information branches are segments of knowledge tree 100. As indicated in the diagram, information branch 120 begins with the root node, "Olympic Sports" and proceeds down until "100M Mens". During annotation, the user selects the lowermost classification term, in the present case, 100M Mens 110, and drops it onto the database entry. The database manager then associates that multimedia file, in the present case, file 130, with the information branch 120 such that during browsing of the database when the user checks the "contents" of node 110, database entry referring to file 130 is found.

One of the more powerful features of the invention is the ability for users to provide annotation on many different levels (of segmentation). FIG. 12 depicts the various levels available to an annotator. The present invention provides for the annotation at the repository level 140 wherein all multimedia files contained within a certain repository will be branded with the annotations provided at this level. The invention further provides for the annotation at the "whole of work" level 142. The user may also take individual segments 144 or even pull individual frames 146 from video files, or alternatively the user may have still images needed annotating which can be achieved at this frame level 146. Users of the invention may also decide to annotate a region within the frame 148 by means of drawing a polygon around the region.

FIG. 12 also depicts the metadata types applicable at each level of annotation. At the first level, that of the repository 140, the only metadata applicable is that of location, specifically, URL's. The second level is the whole of work level 142. This is the level with the greatest amount of annotation options available to the annotating user. In particular the annotating user can associate (1) classification terms/information branches, (2) keywords and (3) catalog entry metadata. At the segment level 144, the annotating user can add start and stop time information, duration information, classification terms/information branches and finally, keyword information. The still frame level 146 and region within still frames 148 both have the capacity to associate classification terms/information branches, keyword information and information relating to the point in segment/time the frame/region relates to.

FIG. 13 depicts the catalog entry fields available to the user in one embodiment of the invention. These fields are only applicable to the whole of work level 142 as depicted in FIG. 12.

Figure 14:
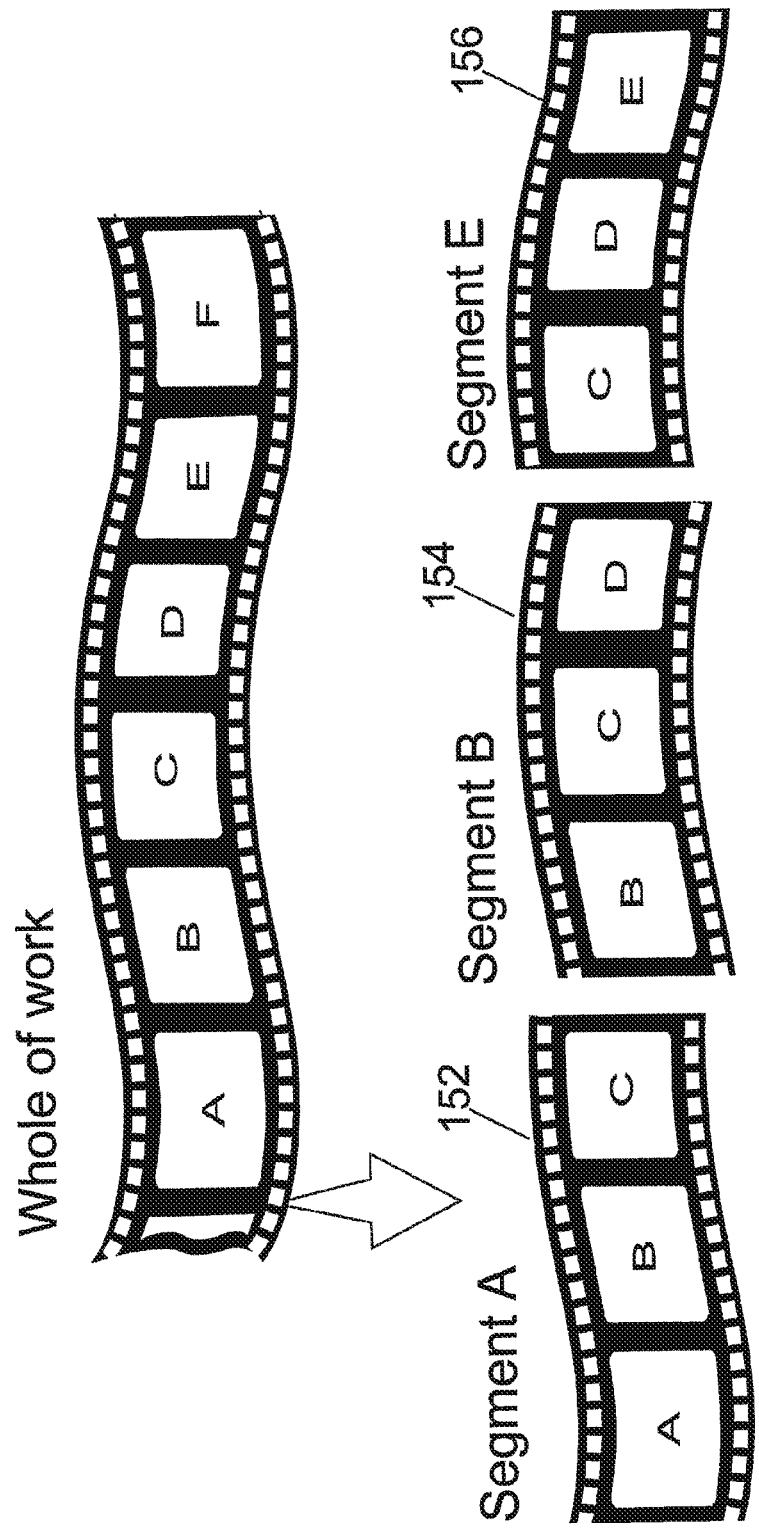

FIG. 14 depicts the segmentation of movie or video files. In this figure, video file 150 is segmented into segment A 152, segment B 154 and segment E 156. Because the multimedia files according to this embodiment of the invention are not required to be duplicated or actually segmented but rather are virtually segmented, the segments 152 through 156 can be overlapping in their content. Indeed, the concept of virtual segmentation also provides for a further additional benefit, deep linking, and the avoidance of copyright infringement. The present invention provides that when a user segments a video file into shorter segments which later are sought to be retrieved, the user is initially presented with the shorter segment and not any of the preceding material that would have been viewed had the whole multimedia file been played to find the desired content. The invention achieves this by automatically populating the time in and time out fields of the segment. When retrieved the database manager provides the user with a link that takes the user to that point in time of the original video file without requiring a second smaller copy of the segment of the file to be resident in a repository.

A further feature of a preferred embodiment of the invention is the feature of multiple levels of access to the database. FIG. 15 depicts the 4 roles currently provided for by the invention. Further the table provided in FIG. 15 depicts the differences in roles carried out by each type of user. In addition to these 4 levels of users, there are various levels provided for granting differing levels of security or access to the administrator, librarian, annotator and searcher roles. The security levels are such that they can be applied so that users can be restricted to certain repositories, or restricted in other ways, including restrictions on functionality. For example, certain users may be prevented from viewing certain material based on the user's location in the world, place in an organisation or age. This may be due to the operation of copyright or censorship laws by certain states or jurisdictions. Further, in a situation where there are multiple metadata databases in operation by various content aggregators and owners across a network, or the internet, a user may be permitted to log into certain databases, but not others.

Figure 16:
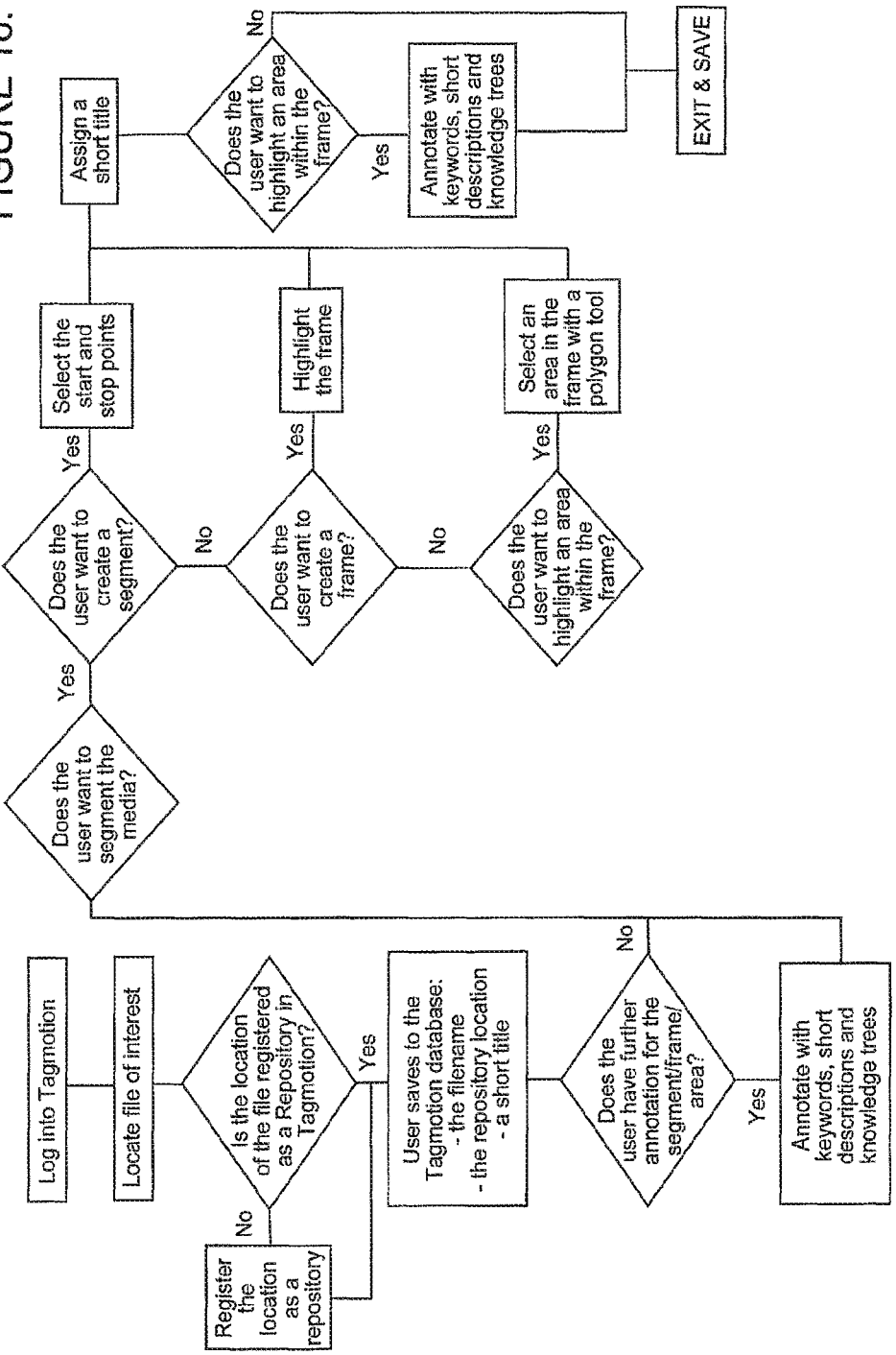

FIG. 16 depicts the process carried out, according to one embodiment of the invention, to virtually segment and annotate multimedia files located on the network. The first step is to determine whether the repository (the volume mounted on the network) is known to the metadata database manager. If the volume is registered then the user provides the multimedia file's path, filename and short title to the metadata database manager. This information is sufficient for a database entry to be created and associated with the multimedia file in question. The database entry can be annotated with any of the fields as permitted and depicted in FIG. 12, including keywords, alphanumeric strings, and information branches pruned from the databases' knowledge trees. A user can takes matters further by virtually segmenting the larger multimedia file into clips of shorter duration or even frames or regions within a frame. In each of these cases the resultant segments, frames, or regions within frames are associated with distinct database entries (by the metadata database manager) to that of the database entry that relates to the whole multimedia file. Once separated from the original database entry, the subsequent database entries can also be annotated with any of the fields as permitted and depicted in FIG. 12, including keywords, alphanumeric strings, and information branches pruned from the databases' knowledge trees.

Thus, the user can use any or all of the information entered by the annotating user to locate the desired multimedia file of interest. This allows the user to conduct keyword searches over (1) catalog entry fields which apply only to the whole of work level, (2) classification terms/information branches, and (3) keywords.

Figure 17:
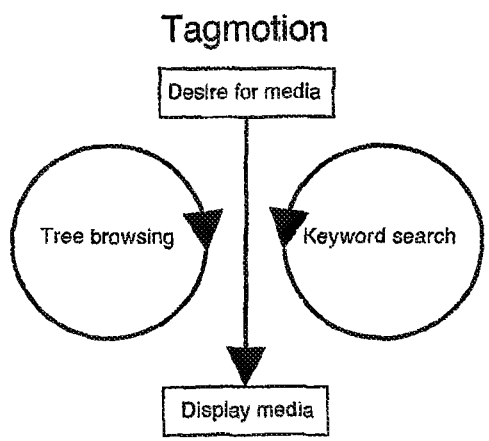
Figure 18:
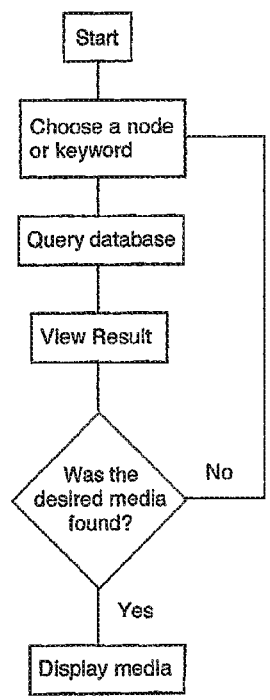

FIG. 17 depicts the broad strategy used by a user to obtain the multimedia file that they desire. According to the present embodiment of the invention, there is provided an iterative process whereby the user searches by utilising keywords or browses the knowledge trees in succession until the entry corresponding to the multimedia file in question is found within the retrieved results. FIG. 18 depicts a similar process in algorithmic form. In the process so described therein, the user first selects a node of the knowledge tree or a keyword to conduct a first level search over the entire database or databases, then determines whether the content of interest is contained within the node or the results returned by the search, if not, the user either browses the tree to arrive at a different node, or conducts a further keyword search to obtain a different set of search results, the process being repeated until the multimedia file desired is located.

Figure 19:
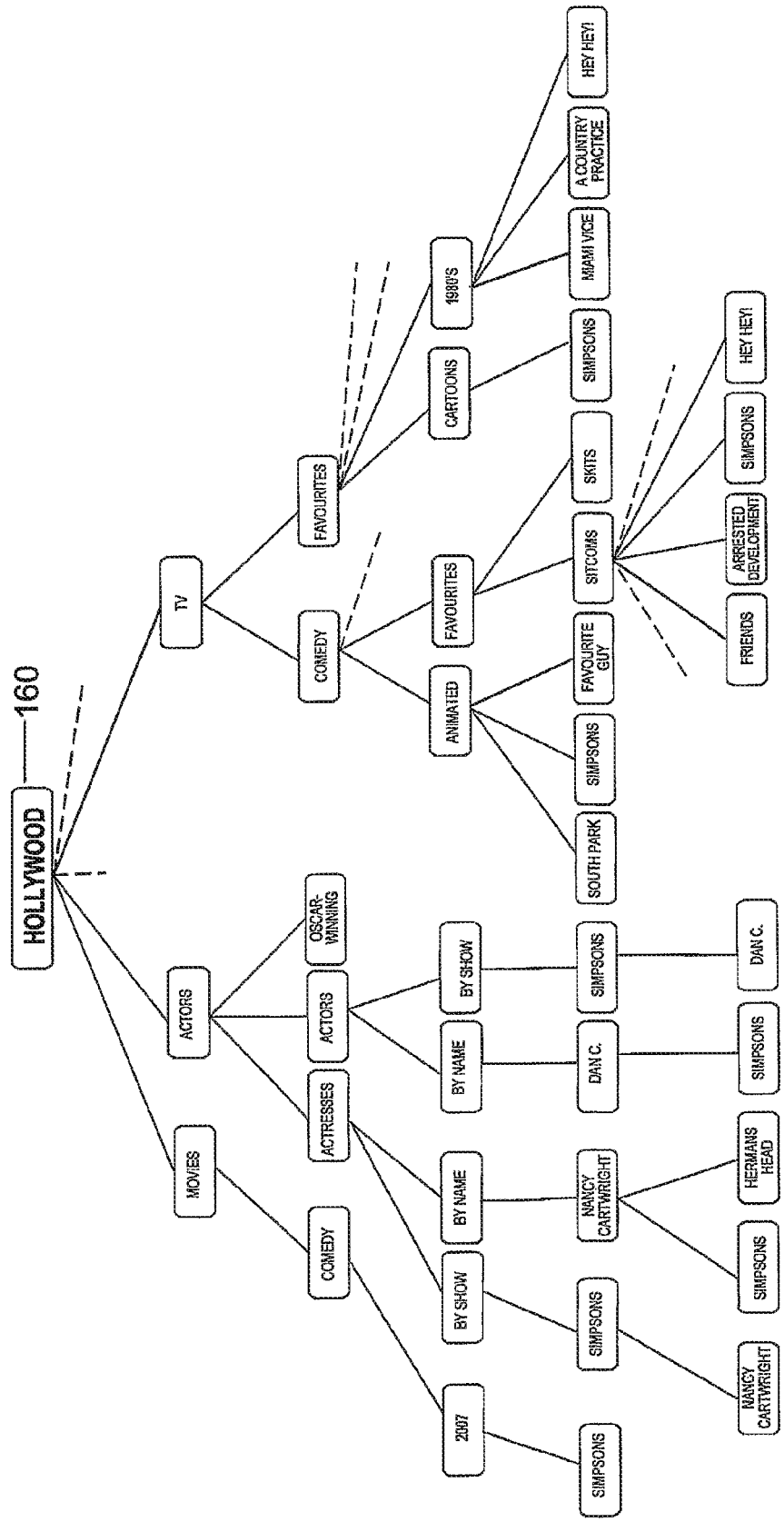
Figure 20:
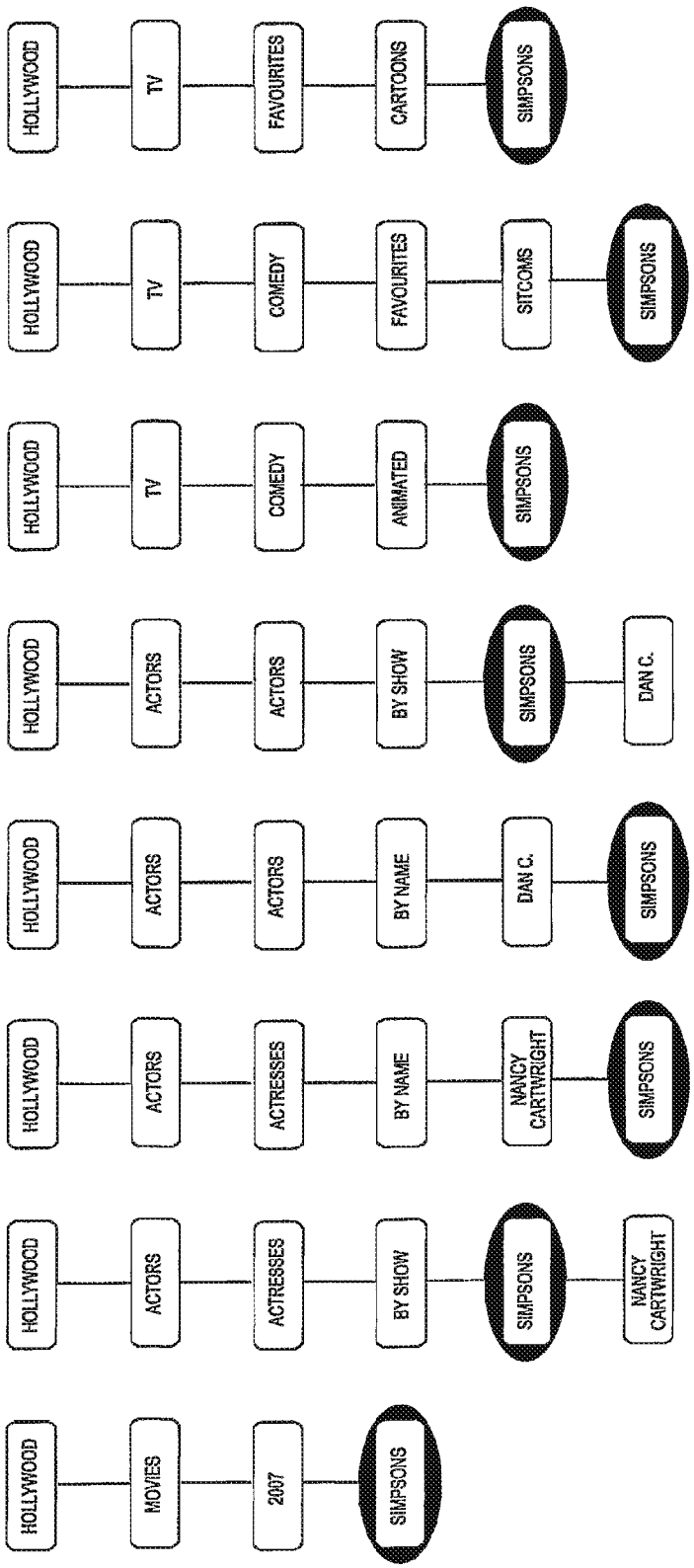

FIG. 19 depicts a hypothetical knowledge tree 160, of a metadata database. The knowledge tree is comprised of a hierarchical structure with "Hollywood" at its root. When the knowledge trees are examined for the occurrence of the term "Simpsons" the information branches 170 are obtained from the knowledge tree 160. As can be seen in FIG. 20 (which is a depiction of the individual information branches of the knowledge tree) the Simpsons feature in many of the information branches of the knowledge tree, at various levels.

Figure 21:
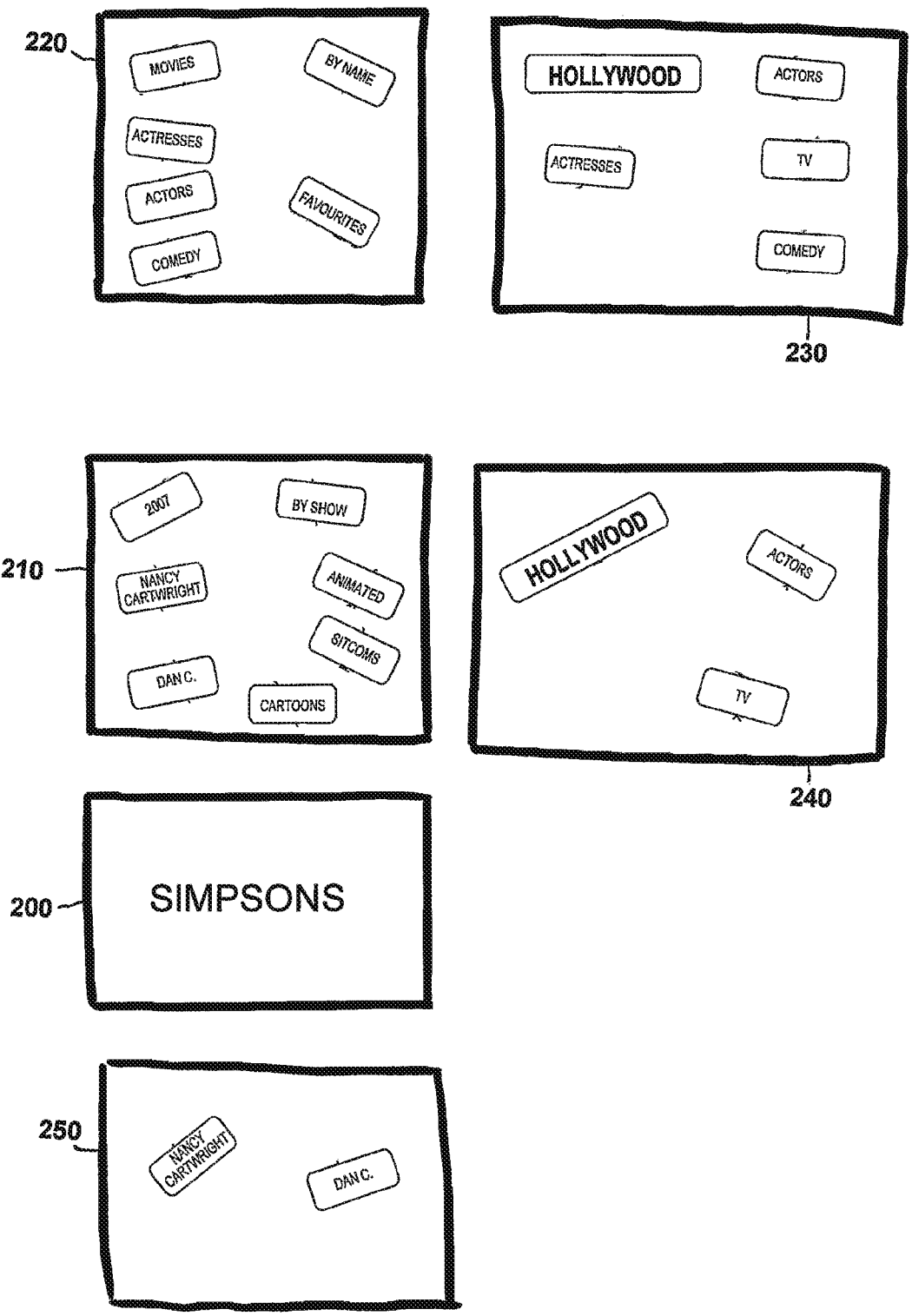
Figure 22:
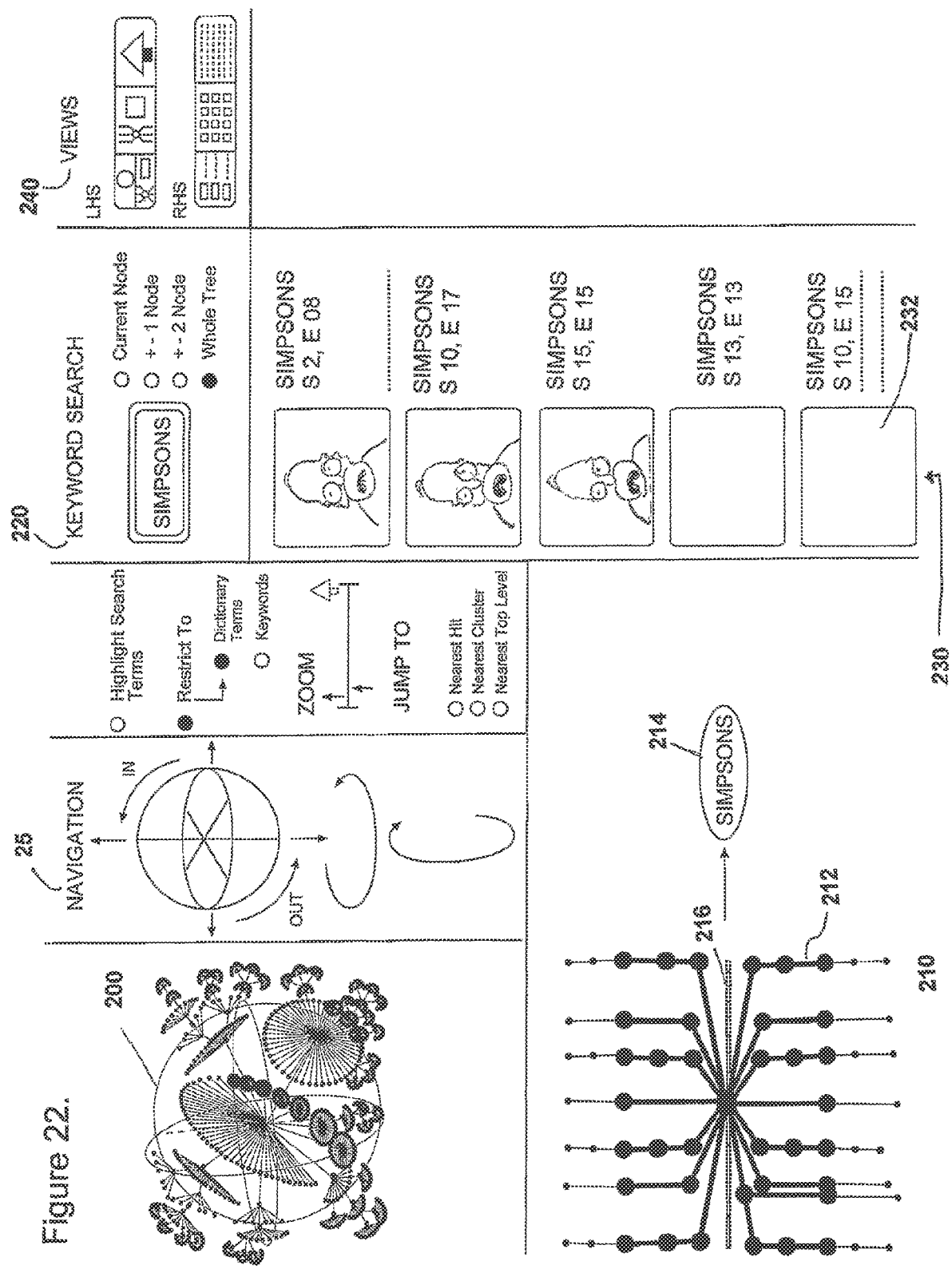

When the information branches below are arranged such that they intersect at the common classification term "Simpsons" and visualised in 3 dimensions the structure depicted in panel 210 of FIG. 22 is arrived at. FIG. 21 depicts 2 dimensional cross sectional views of this three dimensional form. Slice 200 is the slice made at the intersection, and thus only depicts one information branch existing at that level. However if the user takes a slice one level above the intersection 180 the slice 210 is arrived at. Slice 210 depicts all of the information branches as they branch out from "Simpsons". Slices 220 to 240 represent the information branches at those levels above the intersection 180, and slice 250, the one level below the intersection of the classification term "Simpsons".

FIG. 22 depicts a sample screen shot according to one aspect of the invention. The screen is divided into a number of different areas or panels. Panel 200 comprises the knowledge tree view, which is in the present case, a highly complex and populated knowledge tree, panel 210, the intersected branch view, panel 220 the keyword search panel, panel 230 the search results list view, panel 240 the views selector and panel 250, the navigation panel. The intersected tree view is comprised of three elements, the 3D structure 212, vertical slider 216 and information branches 214 that exist at the level set by the slider 216. The search result list view 230 provides a list of database entries 232. The embodiment of the invention depicted in FIG. 16 is highly customisable. The user can select whether to conduct a keyword search over the current node, or whether to conduct the search over a larger portion of the tree or even the whole tree by selecting the appropriate radio dialog box in the keyword search panel 220. In addition the user can restrict searches to classification terms/information branches, catalog entries or keyword fields.

Figure 23:
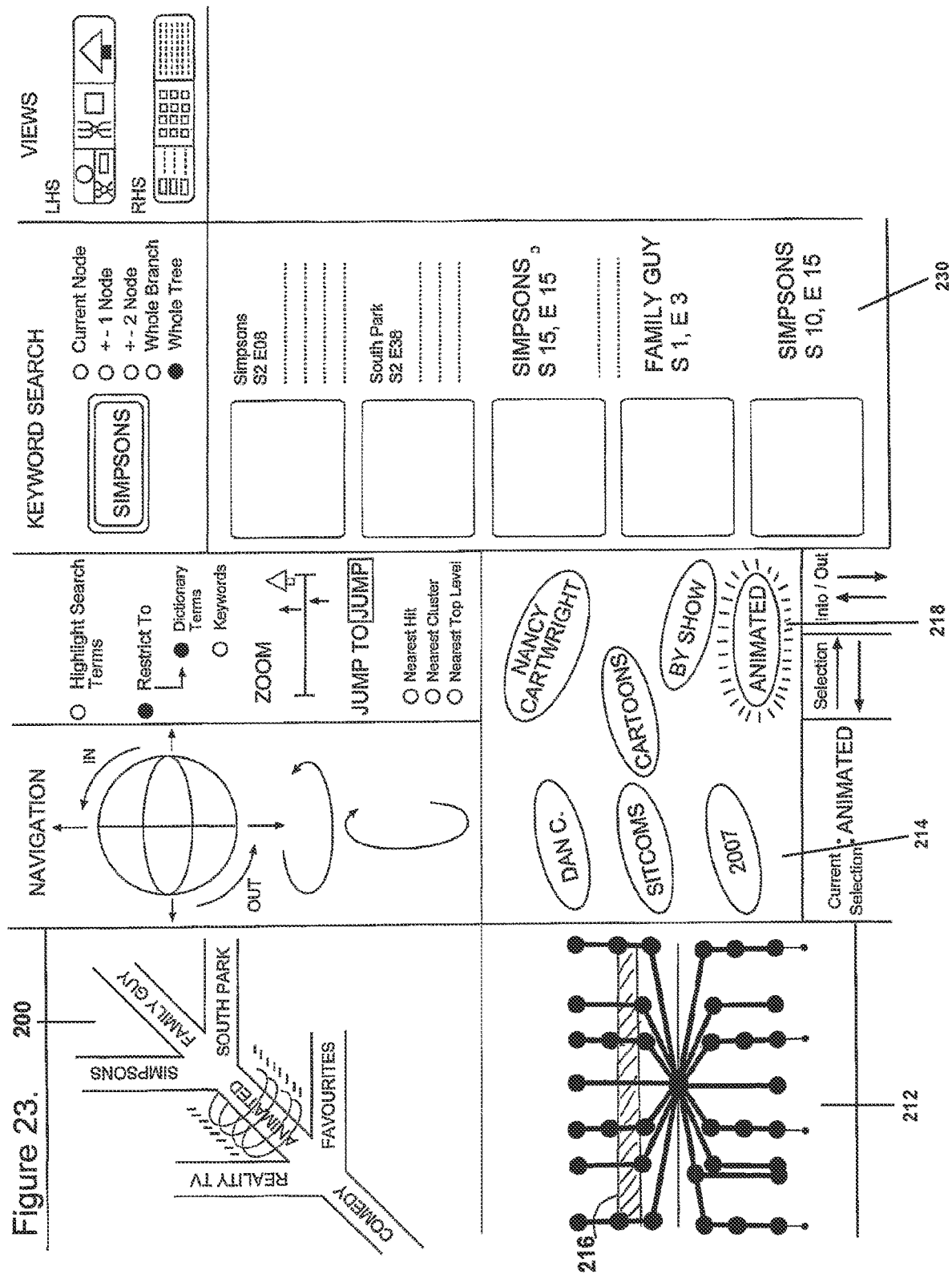

In FIG. 23, the user has taken the results provided by a search for "Simpsons" as depicted in FIG. 16A and further queried the metadata database. In the present case the user has taken the intersected tree view and slid the slider 216 up one level which revealed classification terms 214. The user has then selected "animated" 218. By selecting "animated" 218, the user causes the branch of the knowledge tree to be displayed in the knowledge tree view 200. Further, all multimedia files associated with the node "Animated" are displayed in the search results view.

Figure 28:
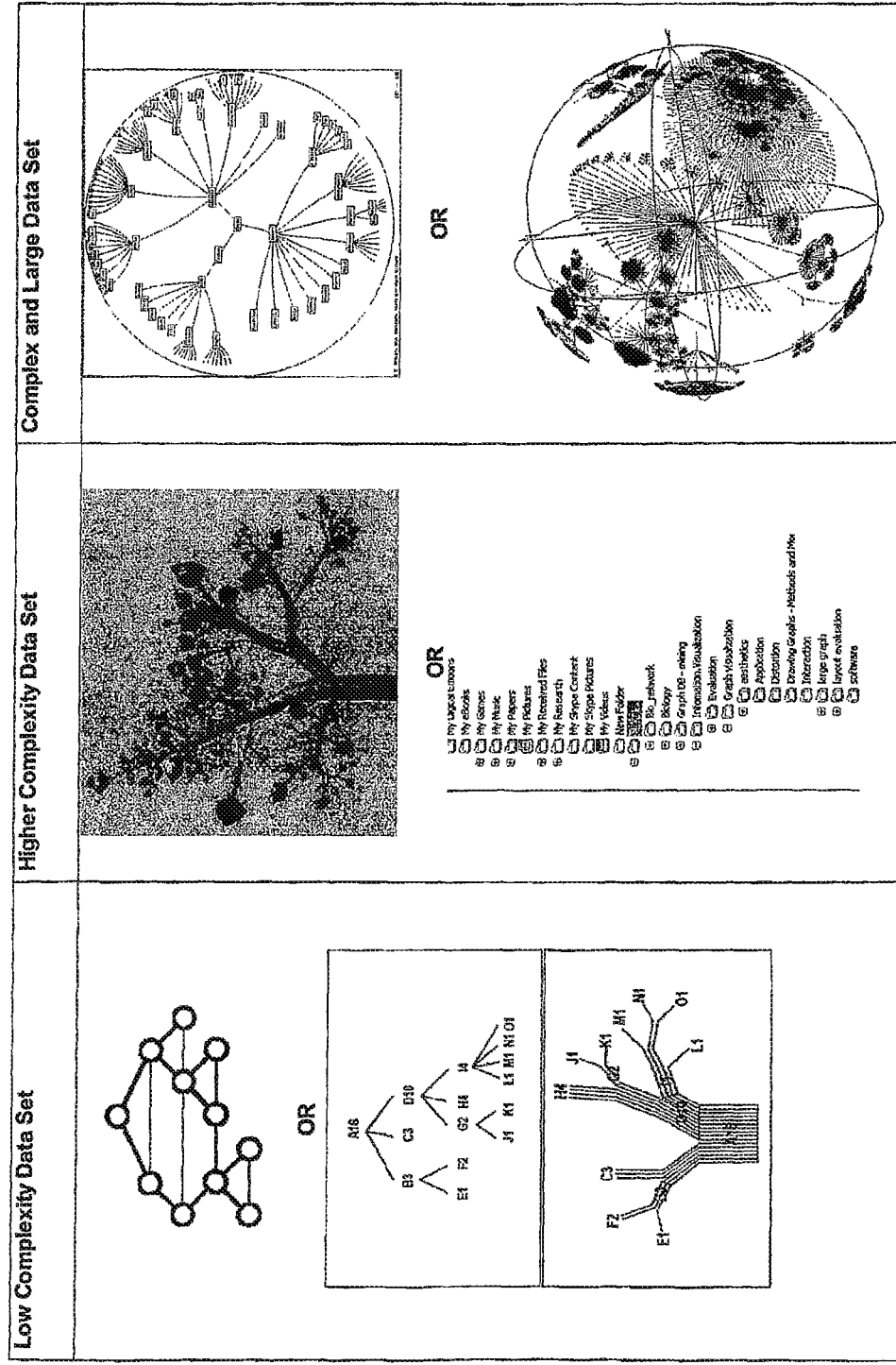

FIG. 28 depicts various representations of knowledge trees structures possible in accordance with the teaching of the present invention. As hierarchical information can get difficult to represent in a traditional tree view as depicted in FIG. 19, different ways of displaying the data have been employed such that no matter how complex a data set, there is firstly, a way of visualising it, and secondly, a way to zoom in and traverse it.

Figure 24:
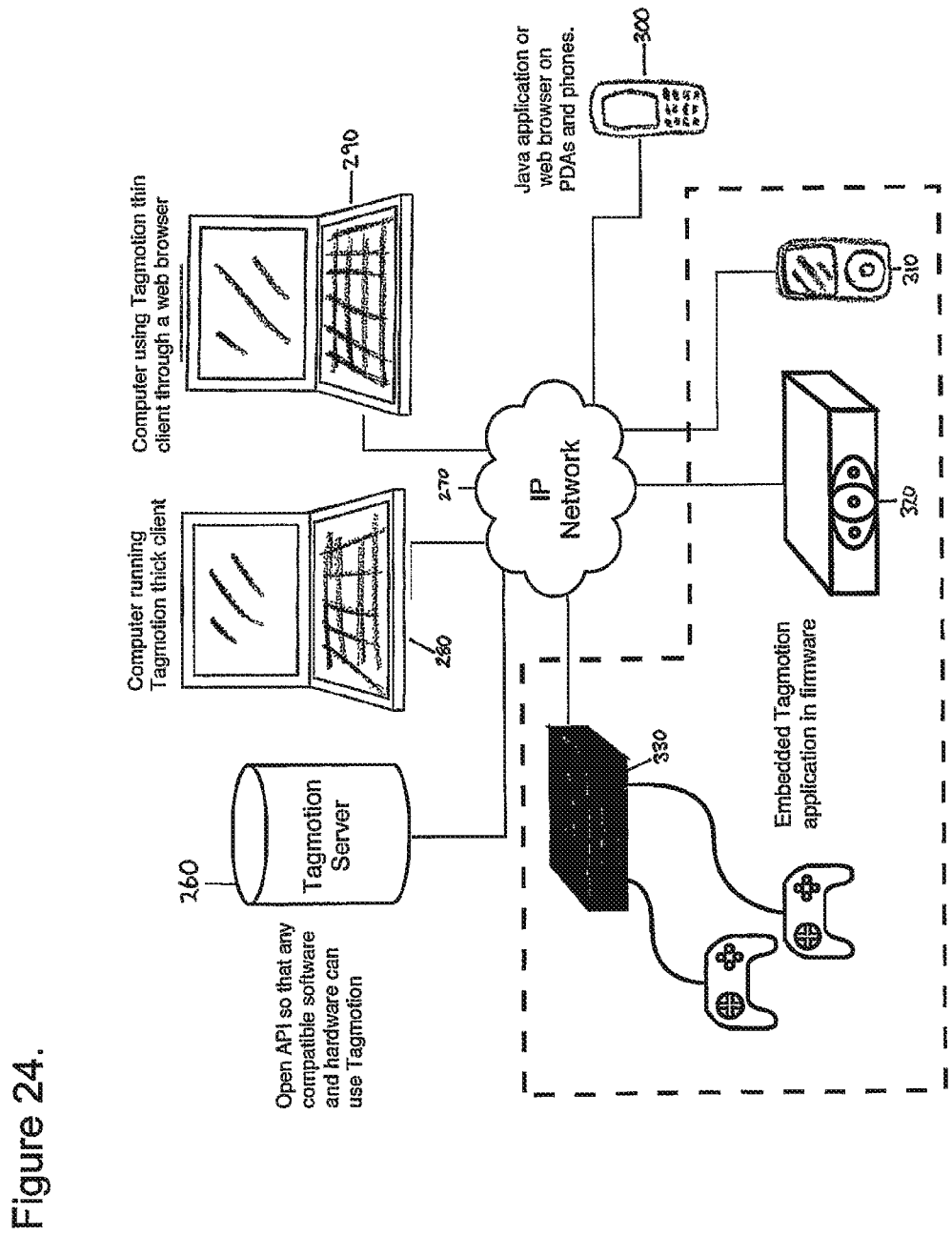

FIG. 24 depicts the various different devices that are encompassed by particular embodiments of the invention. In all of these cases there is a metadata database and manager 260 and IP network 270. The most usual device for the invention to be implemented upon is what is known as a personal computer, which are often sold in desktop and notebook configurations. The personal computer can be a client in one of a number of ways. Computer 280 has installed upon it a web enabled executable program which acts as database client and is capable of exchanging information with the metadata database and metadata database manager 260. This program would need to be installed by any user wishing to access network multimedia files described in the metadata database. The program can be developed into two or more versions. One version of the software is accessible by all levels of users including librarians and administrators and facilitates the management of users and the maintenance of the database, this is called the thick client. In one embodiment of the invention the thin client on the other hand is designed only for the searcher user type and thus no annotation or database management functions are included. The only function that this version facilitates is retrieval of already annotated multimedia files.

A further embodiment of the invention involves the database being accessed through a common web browser such as Firefox, Safari or Internet Explorer as depicted by computer 290 in FIG. 17. As web browsers are bundled with computers pre-loaded, any user should be able to access the metadata database and manager 260 through the common HTML mediated interface. Both fully functional and search only web interfaces can be developed to access metadata database and manager 260, including those that incorporate AJAX technology.

A similar approach can be taken with mobile telephones 300, and personal media players (not shown). Most modern mobile telephones and PDA's have the ability to load executable program files upon them in the form of Java, Windows Mobile CE, Symbian, and more recently Mac OS X executables. In such scenarios the mobile telephone or PDA can be equated with computer 280 with software loaded onto it. Equally however, most modern mobile telephones, PDA's, and personal media players 310 such as the iPod and PSP also feature HTML or web browsers. Thus they may be able to access the database and manager 260 through a browser type interface as in the case of computer 290.

Many household appliances that feature the ability to connect to the internet/IP network and display multimedia files would also be candidates for embedding within their firmware a compatible metadata database client. FIG. 17 depicts an IP enabled portable media player device 310, set top box device 320, and games machine 330 as being suitable candidates for inclusion of the database client in their firmware, or indeed, as in the case of mobile telephones and some personal media players 310, through incorporated web browsers.

Indeed the range of devices is really only limited by their ability to access the internet/network and display multimedia files. Other devices that may be suitable would include video conferencing equipment, routers and network attached storage devices, in car navigation display units, internet kiosks and in car/plane entertainment systems. Further, the search and retrieval function depicted in FIGS. 22 and 23 need not be implemented in any client device. Indeed, in one embodiment of the invention, there is provided an open API for interaction with the metadata database such that users may develop their own mash up applications that utilize the power of the metadata database. For example, with respect to the in-car navigation system, it will generally be aware of its location via GPS. Further, the structure of a metadata database, and importantly, the knowledge tree contained therein might be such that it has branches that correspond to different GPS locations. As the user passes through areas in which there are associated database entries (given the GPS co-ordinates) certain videos and/or audio can be displayed on its display and through its speaker. Such technology would be ideal for the provision of location specific advertising. A further embodiment not involving search and retrieval functions may involve a set top box that has loaded within it firmware that recognizes the type of program being watched (previously annotated) and which searches for similar content over the internet for the viewer whenever a button is pushed on the remote, or which searches for advertisements that have been programmed to appear in conjunction with certain programs, eg. BMW advertisements during "Top Gear" a motoring television program.

Figure 25:
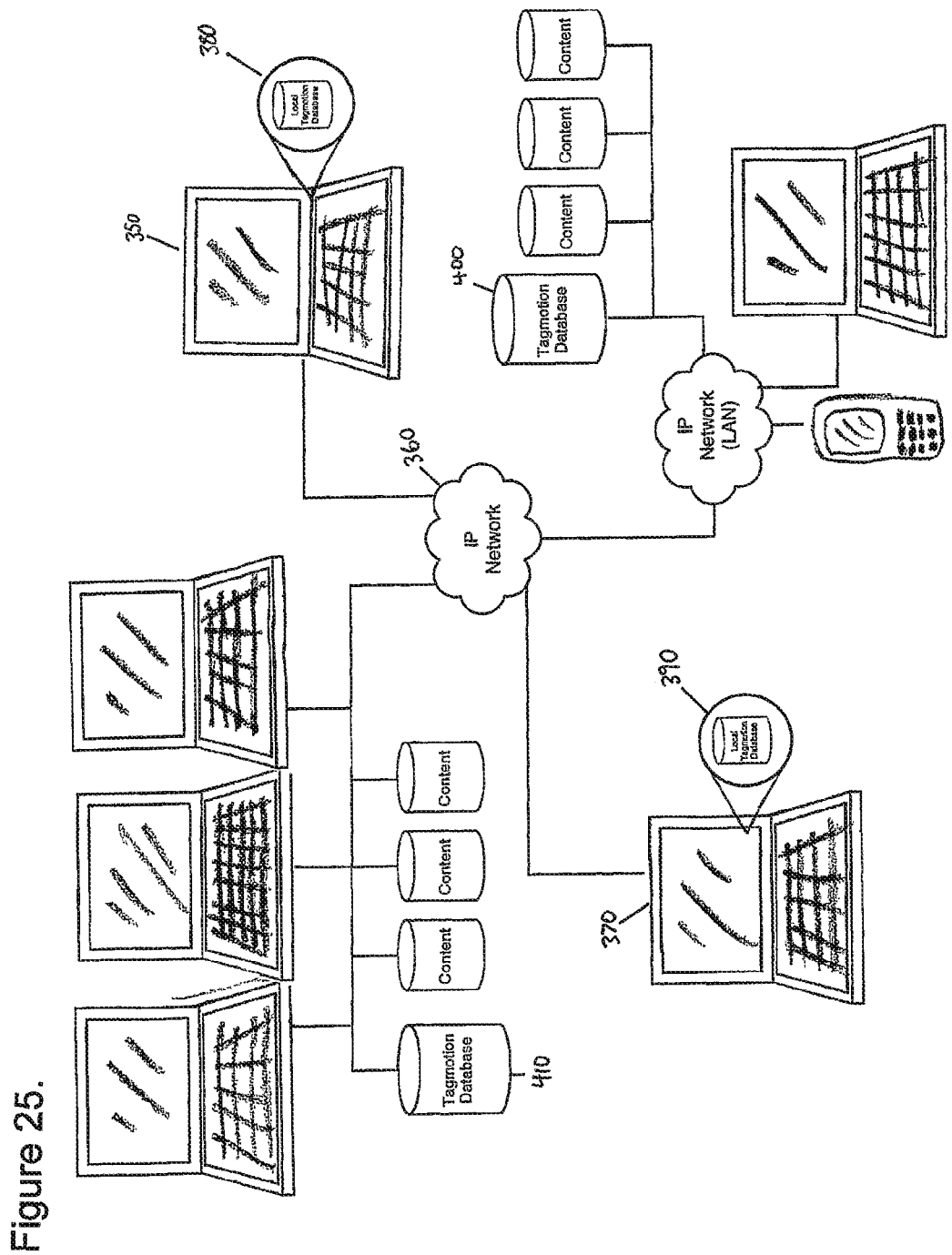

FIG. 25 depicts a many metadata database implementation of the invention. FIG. 25 depicts two standalone computers 350, 370 containing metadata databases 380, 390, connected through the internet 360, which is in turn in connected to two other tagmotion databases 400, 410. In one embodiment of the invention there is provision for the databases to exchange information by means of exporting database entries and dictionaries of classification terms. This can be done manually or automatically between users in a group where permission exists between them for this to happen. In this way, they create a group taxonomy where each benefits from the efforts of the other, enriching the metadata including the 'global (or collective) dictionary terms', thus making the search process more and more intuitive and above all, precise. Indeed, depending on whether the user had the necessary privileges, the user can log into any one of the databases for search and retrieval. If found, the user might decide to export the entry into their own database, or the dictionary terms into their own dictionary. Then, the user may choose to import metadata such as catalog entries, dictionary (classification) terms and storyboards (containing metadata for segments of video files, for example) into their own database. These imports can be from other personal databases or from the collective one. In this way, one's own personal database or 'view' can be enriched as desired, by exploiting the annotations of others.

In one embodiment of the invention it would be possible to provide a system whereby all users are granted librarian access which means that anyone could add whole of work database entries and additions to the global dictionary from which classification terms appearing on the knowledge trees are selected. In such an embodiment the system would provide for an online "wiki" in which the experience of the group using the wiki is affected by each of the users participation. In such a scenario, potentially involving millions of users as in the case of youtube.com or myspace.com websites, content would be rapidly categorized according to potentially millions of different points of view, thereby creating the rich, metadata-dense, database which in turn results in the formation of a detailed knowledge tree in which it is likely you would find multimedia files of interest.

Figure 26:
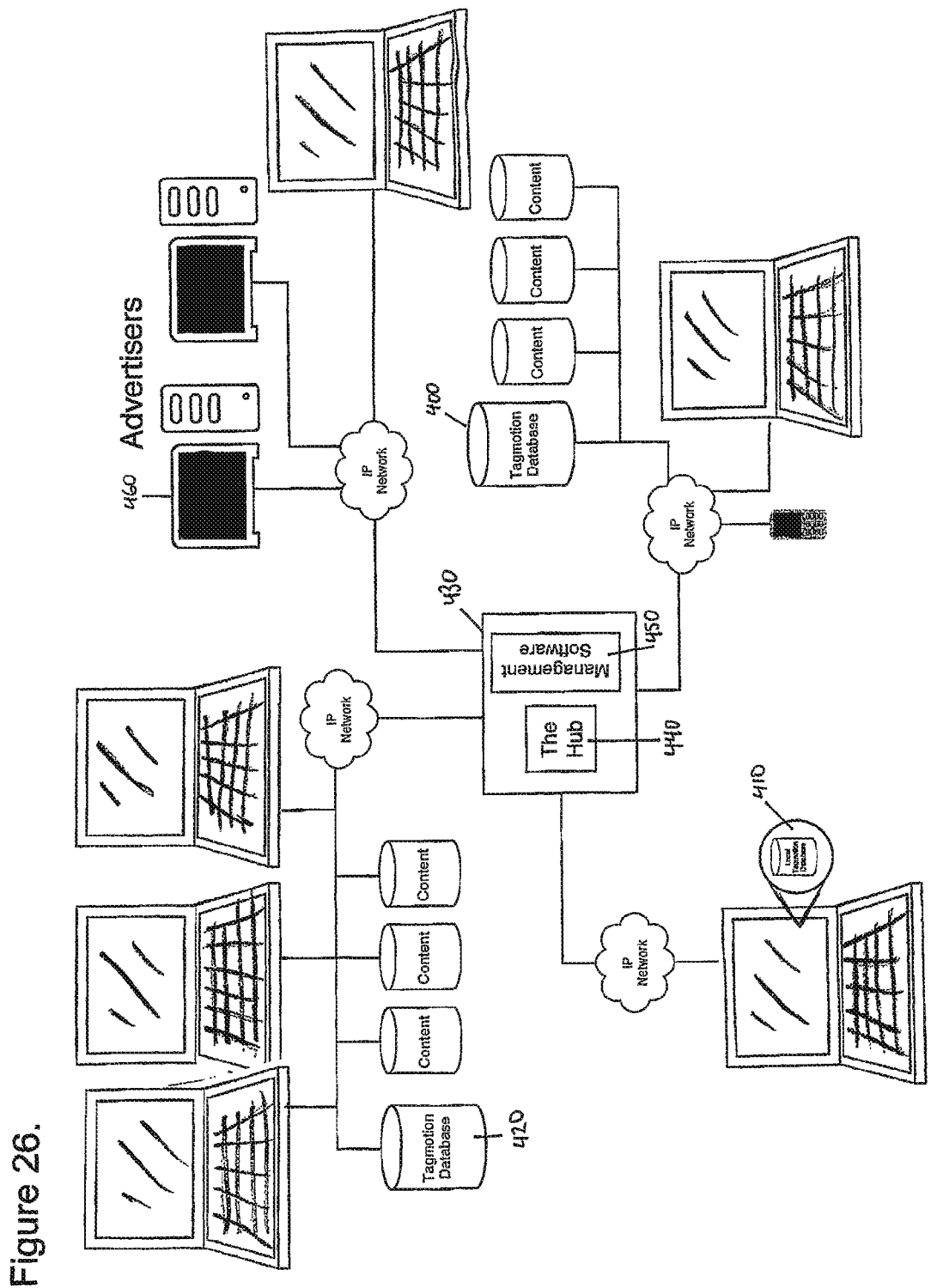

FIG. 26 depicts a similar array of metadata databases as depicted in FIG. 19. In particular there are databases 410, 420 and 430 which are all connected the internet and through it to advertising hub 430. Advertising hub 430 is in turn comprised of database 440 and database manager 450. In this embodiment of the invention the metadata from participating metadata databases is uploaded into the database 440 where their database entries are analysed and information branches extracted therefrom. Advertisers 460 are then able to log into the hub 430 through the manager 450 and select individual keywords, information branches and/or nodes on knowledge trees for purchase or bidding in relation to which their advertisements would be played.

Figure 27:
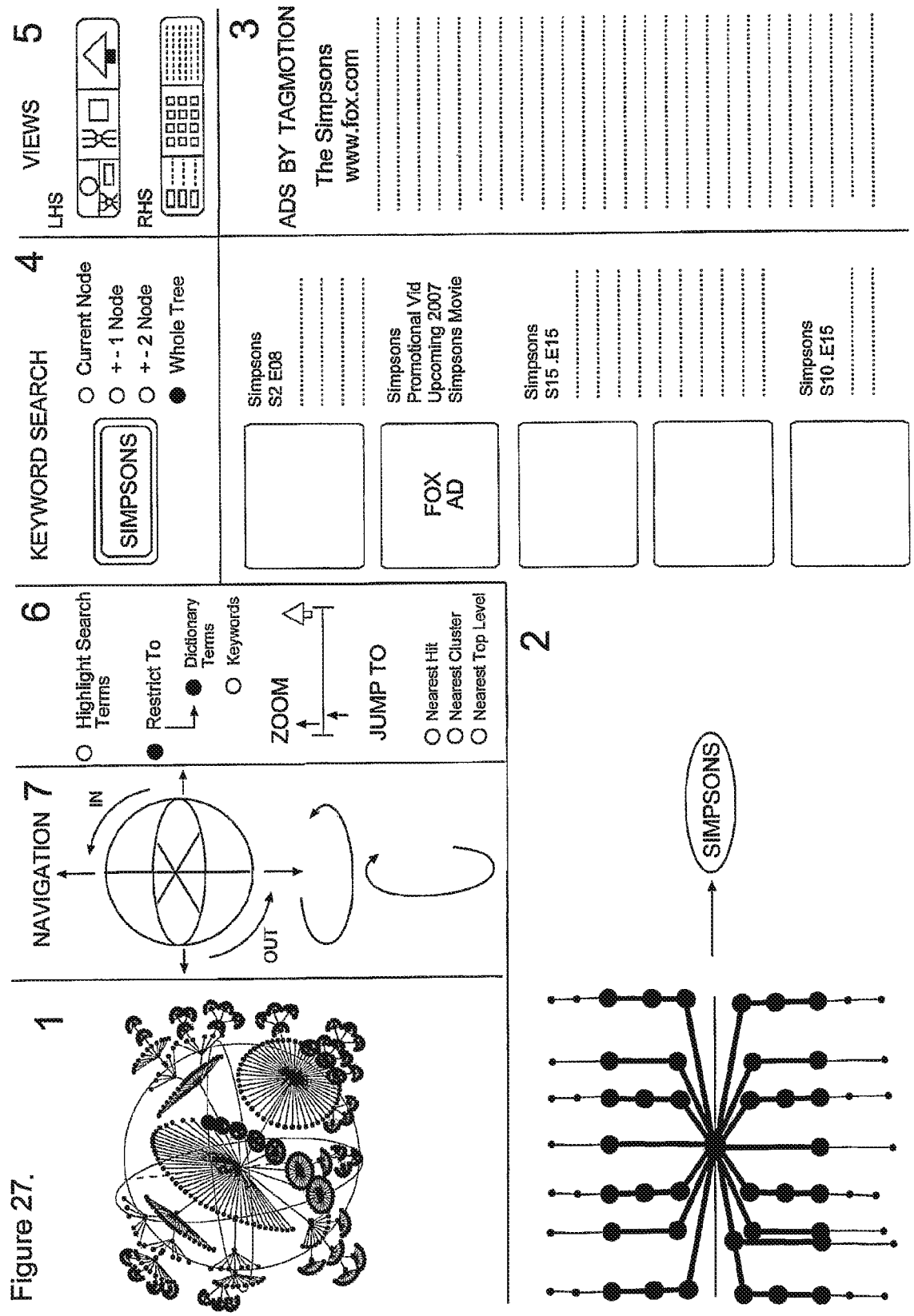

FIGS. 27, 29, 30 and 31 depict the interaction a user has with an advertiser who has purchased either keywords or information branches used in the metadata databases' entries. FIG. 27 depicts the same scenario as depicted in FIG. 22, that of a user who has just conducted a keyword search using the word "Simpsons". In the present case the user has not yet selected an individual information branch and thus the basis for serving the advertisements would be the word "Simspons" or the existence of one or more particular information branches. As semantic meaning is caught up in an information branch they can be used to provide more targeted and contextually relevant advertisements.

Figure 29:
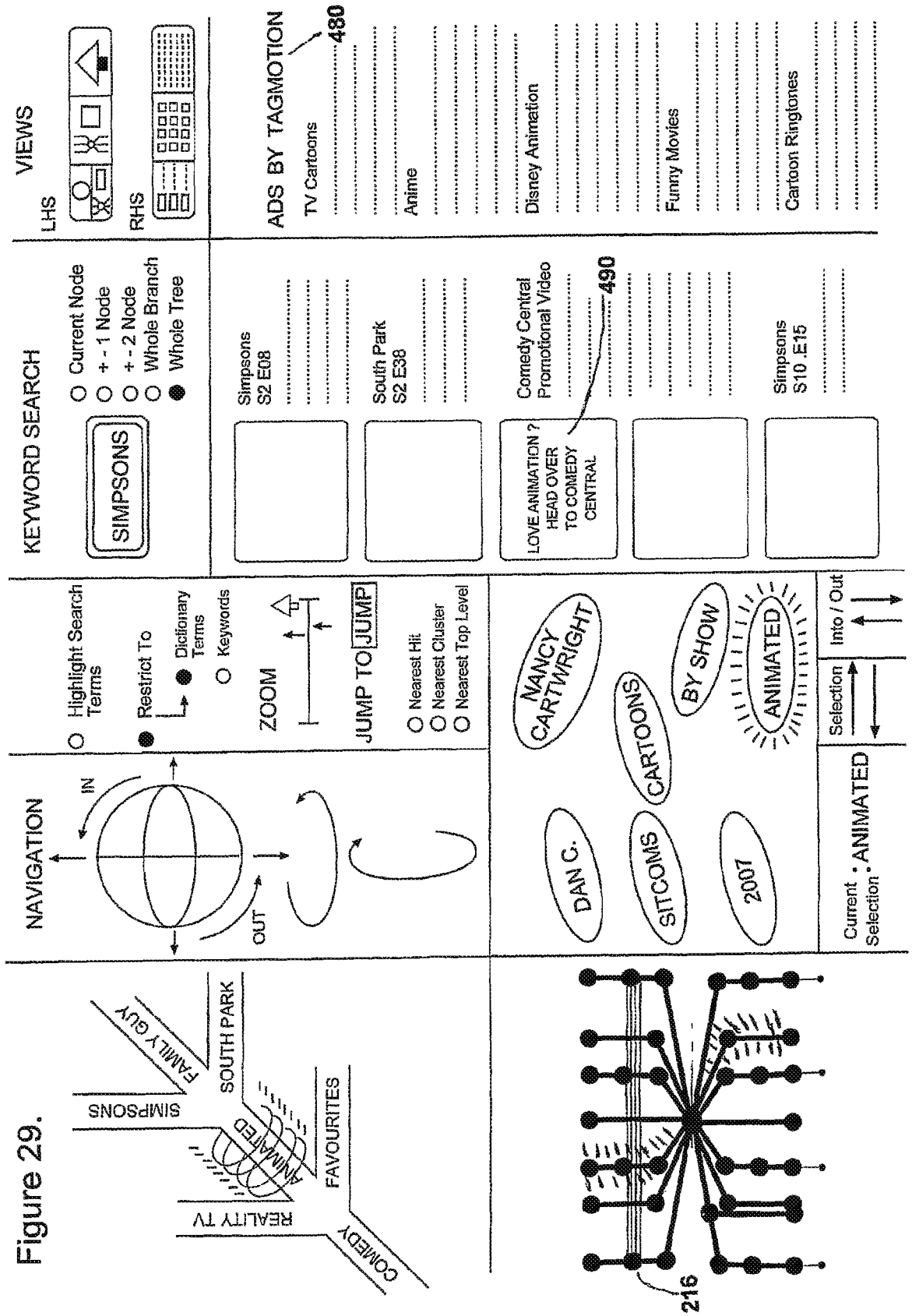

FIG. 29 depicts the next step in which the user uses slider 216 to go up one level/slice and selects the "animated" information branch. As the user has selected an individual information branch this can be used as the basis to serve up further contextually related advertisement 480.

FIG. 29 also highlights another potential advertising possibility in that positions on the metadata database's knowledge trees can be sold for advertisers to upload content in respect of their goods and services. In FIG. 29 advertisement 490 has been inserted at Hollywood:TV: Comedy:Animated, the active node. Such positions may be used to feature content including promotional or traditional advertising video, or it may simply act as a link to a website or other position on the knowledge tree where the advertiser may have more of a presence. Indeed, such an approach is likely to facilitate the development of metadata databases in which advertising and promotional content is the sole content of the database. In such case the knowledge tree and associated search methods could result in a video yellow pages in which advertisers place their advertisements at particular places on the tree as opposed to being arranged alphabetically by reference to the goods and services they supply.

Figure 30:
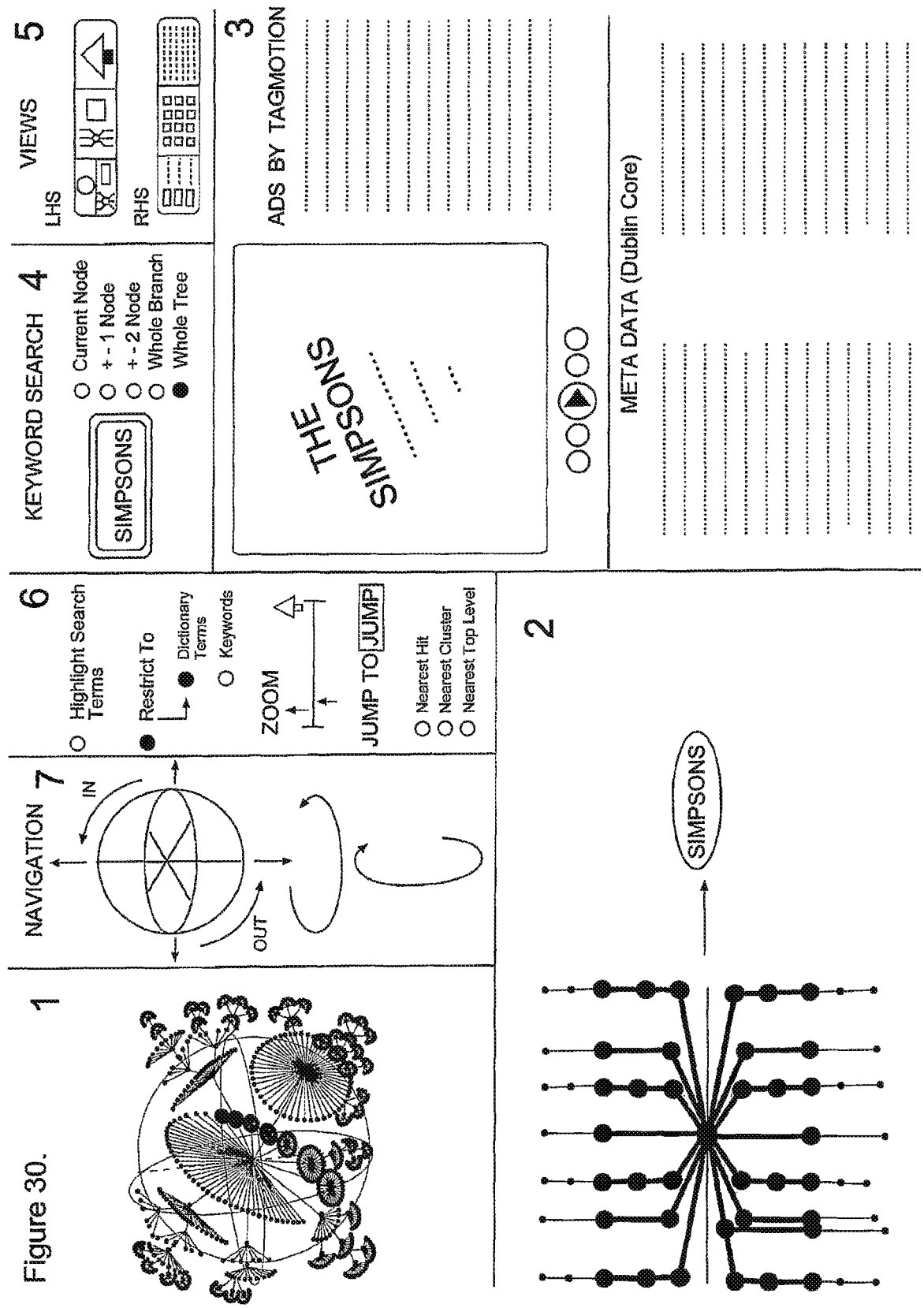
Figure 31:
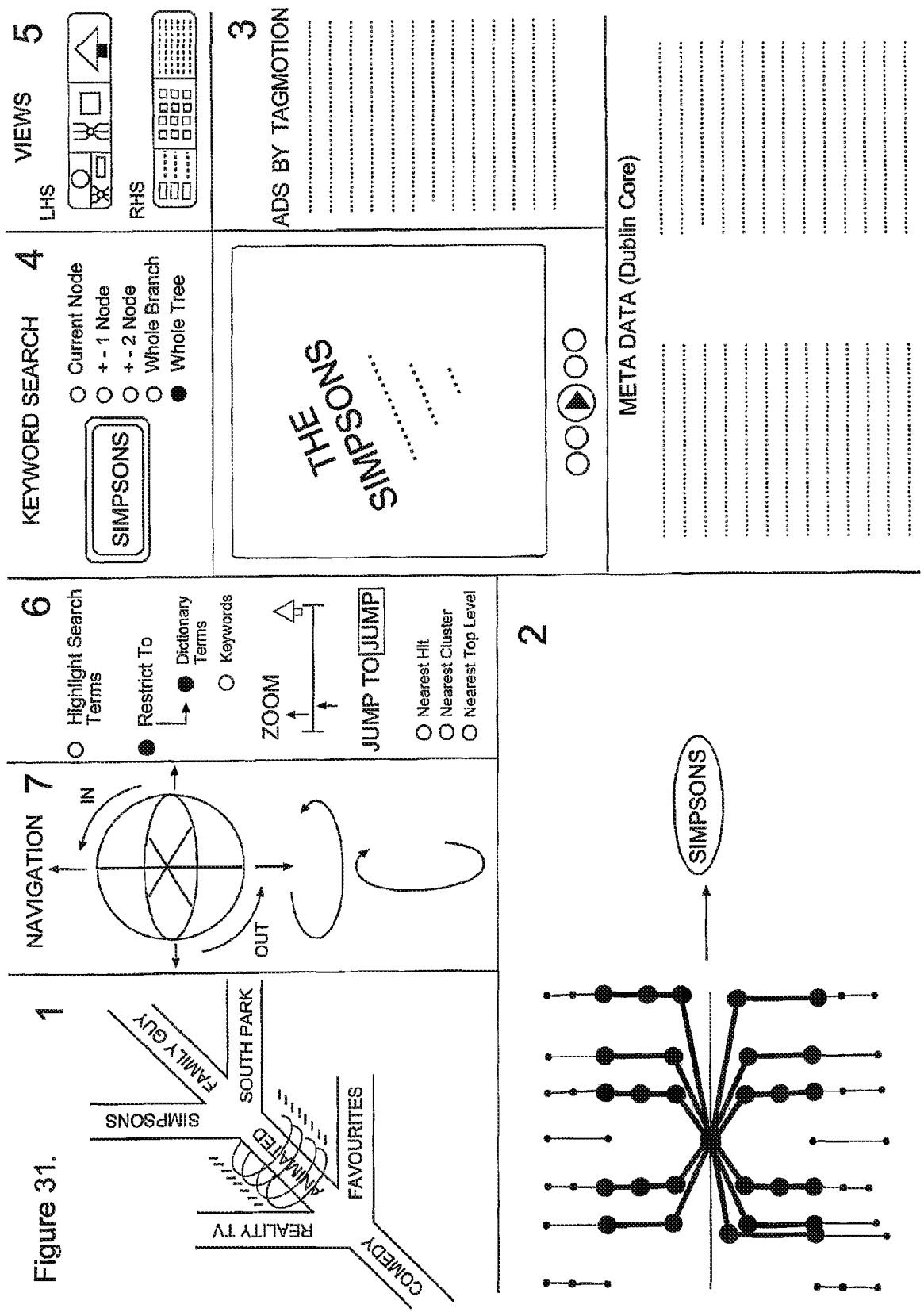
FIG. 31—depicts a screen shot after the user selects one of the information branches according to one aspect of the invention.

FIG. 30 depicts a screenshot of an embodiment of the invention where the user has selected one of the Simpsons videos from FIG. 29 and requested it to play. In this embodiment the search list pane is replaced with a multimedia player and the reproduction of the metadata recorded in respect of the multimedia file. When the single database entry is selected, the intersected tree view changes to reflect the 3D structure of only those information branches associated with that particular database entry. Further, advertisements 500 are served up with the multimedia file as determined by the remaining information branches and keywords contained within the various metadata database fields available for that type of entry. As there are fewer branches at this point, the advertisements will be more targeted than those when there were many more information branches associated with a given view. However, notwithstanding that there are fewer intersecting branches, there are still more than one, and therefore no one information branch of the knowledge trees is shown in the knowledge tree pane 200, but rather the whole tree is shown with highlighted "hits" either being information branches of the knowledge trees or nodes in which there are database entries that have the searched for keyword in their fields. FIG. 31 differs from FIG. 23 as the user selected one particular information branch 510, which then has the effect of highlighting that information branch of the knowledge tree in tree view pane 200 as depicted. Also as the intersected tree view has been used to select one particular information branch, the same branch of the knowledge tree is highlighted in the pane above. Further, as only one branch has been selected, the semantic meaning of the branch should provide for the serving of even more context specific advertisements.

In an alternative embodiment of the invention, rather than the user navigating through a 3D representation of the knowledge tree with the user pausing to see what is contained at each node of the tree, the user in this alternative embodiment actually navigates a 3D space in which the content rather than metadata descriptors is actually traversed. In some embodiments you may have intersected information branches being represented by the content associated with the branches. In other embodiments it may be the structure of the whole tree which is represented by content (that is playing or has representative video frames depicted) by which a user navigates themselves. Different audio or video content will come into view as the user moves through the landscape. That is, it will have the effect of flying through the content in a 3 dimensional space. As this happens, the content being displayed changes according to underlying information branches (that are hidden from view), and what they represent. This effect may also be enhanced by spatial audio controls whereby the sound pertaining to a particular file becomes louder as the user 'flies' closer to it, and softer as he starts to 'fly' away and/or the speed of video playback becomes slower as the user 'flies' closer to it, and faster as he starts to 'fly away'. This embodiment of the invention could be provided in the form of an executable program, an AJAX or similar website, or indeed, inside existing three dimensional environments such as Second Life developed by Linden Labs.

The person skilled in the art will appreciate that whilst this invention has been described in respect of audio, images and movie files located on the internet, the invention is equally applicable to other items of interest located on the internet including documents including HTML documents, information contained in documents, executables, indeed anything of interest that can be located by a URL and filename.

What is claimed is:

1. A method for distributing multimedia files, or portions thereof, each multimedia file having a true start point and end point, the method comprising:
    identifying a URL of a multimedia file in an online distributed digital repository;
    creating a first database entry for metadata associated with the identified URL;
    assigning keywords and classification term hierarchies to the first database entry;
    creating at least a second database entry by virtually segmenting the multimedia file into a segmented region within an individual frame, the individual frame when visually presented having a whole area dimension extending to the outer confines of the individual frame, the segmented region having an area dimension less than the area dimension of the individual frame, the virtual segmentation of the multimedia file including assigning one or more of a keyword and a classification term hierarchy to the at least the second database entry;
    storing the first and second database entries in a metadata database remotely from the online distributed digital repository;
    receiving one or more queries including one or more of classification term hierarchies and keywords;
    presenting results of a keyword query three-dimensionally on a screen divided into panels, one of the panels being a panel to navigate the results of the query; and
    retrieving the segmented region of the individual frame from the online distributed repository.

2. A system for tagging a region within a frame of a digital video file stored in a distributed manner online, the system comprising:

a metadata database configured to store metadata related to the video; and a processor configured to generate a metadata database entry in said metadata database that includes identification of a segmented region within a frame of the video, the frame when visually presented having a whole area dimension extending to the outer confines of the frame, the segmented region having an area dimension less than the area dimension of the frame, the identification including a point in time, said processor being configured to provide a link to the point in time in the video file, said processor being configured to assign a classification term to the database entry, the classification term being organized in a hierarchy compared to other classification terms in said metadata database, said processor being configured to permit a user to conduct a keyword search of the hierarchical classification terms in said metadata database to retrieve the segmented region within the frame of the video, said processor being configured to present results of the keyword search three-dimensionally on a screen divided into panels, one of the panels being a panel to navigate the results of the search, and said processor being configured to display the segmented region of the video file associated with the link.

3. The system of claim 2, wherein said metadata database is configured to store only metadata.

4. The system of claim 2, wherein the region within the video frame is defined by a polygon.

5. The system of claim 2, wherein said processor is configured to generate a metadata database entry that includes fields for start time, end time, duration, location, short title, and keyword.

6. The system of claim 2, wherein the database entry is associated with a separate database entry relating to a whole of work entry that includes a URL to the video file.

7. The system of claim 2, wherein said metadata database is configured for access via an applications program run on a client computer.

8. The system of claim 2, wherein said metadata database is configured for access via an applications program run on a mobile communications device.

9. A method for tagging a region within a frame of a video file, comprising:

populating metadata fields of a metadata database with a file name and a start time of a video file, the metadata database being remote from an online distributed digital repository;

segmenting frames of the video file into segmented regions within the frames, including assigning a point in time with each segmented region, each frame when visually presented having a whole area dimension extending to the outer confines of each frame, each segmented region having an area dimension less than the area dimension of the frame containing the segmented region;

providing a link to the point in time in the video file containing the segmented region to retrieve the segmented region;

assigning a classification term to each segmented region;

arranging the classification terms in a hierarchical structure;

permitting a keyword search of the classification terms;

presenting results of the keyword search of the classification terms three-dimensionally on a screen divided into panels, one of the panels being a panel to navigate the results of the search; and retrieving the segmented region of the video file based on the keyword search.

10. The method of claim 9, wherein the segmenting of frames includes selecting a region of a frame of the video using a polygon drawing tool.

11. The method of claim 9, wherein the file format of the video file is MPEG-4.

12. The method of claim 9, further comprising accessing, with an application on a client computer, the metadata database to permit a user to modify an entry on the metadata database.

13. The method of claim 9, further comprising accessing, with an application on a mobile communications device, the metadata database to permit a user to modify an entry on the metadata database.

14. The method of claim 9, wherein the segmenting is virtual.

15. The method of claim 9, further comprising presenting results of a keyword search of the classification terms as video content shown three-dimensionally.

16. The method of claim 9, further comprising displaying the hierarchical structure of classification terms in a tree structure.

* * * * *